(12) United States Patent
Oyama et al.

(10) Patent No.: US 6,845,003 B2
(45) Date of Patent: Jan. 18, 2005

(54) METAL COLLECTOR FOIL FOR ELECTRIC DOUBLE LAYER CAPACITOR, METHOD OF PRODUCING THE METAL COLLECTOR FOIL, AND ELECTRIC DOUBLE LAYER CAPACITOR USING THE METAL COLLECTOR FOIL

(75) Inventors: Shigeki Oyama, Saitama (JP); Manabu Iwaida, Saitama (JP); Kenichi Murakami, Saitama (JP); Hiroto Kobayashi, Saitama (JP); Koichi Yoshida, Tokyo (JP); Hiroyuki Saito, Tokyo (JP)

(73) Assignees: Honda Motor Co., Ltd., Tokyo (JP); Nippon Chemi-Con Corporation, Tokyo (JP)

(*) Notice: Subject to any disclaimer, the term of this patent is extended or adjusted under 35 U.S.C. 154(b) by 0 days.

(21) Appl. No.: 10/724,352

(22) Filed: Dec. 1, 2003

(65) Prior Publication Data

US 2004/0130850 A1 Jul. 8, 2004

(30) Foreign Application Priority Data

| Nov. 29, 2002 | (JP) | ................................. 2002-348885 |
| Nov. 29, 2002 | (JP) | ................................. 2002-348904 |
| Nov. 29, 2002 | (JP) | ................................. 2002-348951 |
| Oct. 1, 2003 | (JP) | ................................. 2003-343756 |
| Oct. 1, 2003 | (JP) | ................................. 2003-343762 |
| Oct. 1, 2003 | (JP) | ................................. 2003-343835 |

(51) Int. Cl.$^7$ ................................................ H01G 9/04
(52) U.S. Cl. ........................ 361/502; 361/508; 29/25.03
(58) Field of Search ................................. 361/502, 508, 361/516, 528, 532; 29/25.03

(56) References Cited

U.S. PATENT DOCUMENTS 6,262,878 B1 * 7/2001 Shirashige et al. ......... 361/508
6,456,483 B1 * 9/2002 Chiavarotti et al. ........ 361/508
6,493,210 B2 * 12/2002 Nonaka et al. ............. 361/502

FOREIGN PATENT DOCUMENTS

| JP | 11-283871 A | 10/1999 |
| JP | 2001-176757 | 6/2001 |

* cited by examiner

Primary Examiner—Anthony Dinkins
(74) Attorney, Agent, or Firm—Arent Fox PLLC

(57) ABSTRACT

A metal collector foil for an electric double layer capacitor is an etched metal collector foil having an oxide film in an amount of not greater than 300 mg/m$^2$, and a capacitance per unit surface area of not less than 150 $\mu$F/cm$^2$. The etched metal collector foil is free from a dielectric layer formed by an anodic formation process on a surface of the etched metal collector foil. A method of producing the metal collector foil and an electric double layer capacitor incorporating therein the metal collector foil are also disclosed.

16 Claims, 9 Drawing Sheets

METAL COLLECTOR FOIL FOR ELECTRIC DOUBLE LAYER CAPACITOR, METHOD OF PRODUCING THE METAL COLLECTOR FOIL, AND ELECTRIC DOUBLE LAYER CAPACITOR USING THE METAL COLLECTOR FOIL

FIELD OF THE INVENTION

The present invention relates to a metal collector foil for use in an electric double layer capacitor, a method of producing the metal collector foil, and an electric double layer capacitor using the metal collector foil.

BACKGROUND OF THE INVENTION

Various electric double layer capacitors are known heretofore. Japanese Patent Laid-open Publication (JP-A1) No. 11-283871 discloses an invention that focuses in particular on the strength of a metal collector foil for such electric double layer capacitors. It is stated in this publication that certain improvements in an electrode assembly have been proposed but the proposed electrode assembly is relatively weak in strength and hence is likely to be damaged during its manufacture or when it is laminated with a separator to form a capacitor. Taking this prior problem into consideration, the invention disclose in the aforesaid Japanese publication seeks to provide a metal collector foil for use in the electrode assembly and having a strength which is sufficient to withstand a rupture energy of at least 3.0 kg mm.

Based on the disclosure of JP-A1-11-283871, many sample electric double layer capacitors were produced by the present inventors for evaluation. The produced samples indicated that the metal collector foil was satisfactory in terms of strength, but due to the resistance value increasing beyond an allowable limit as the times goes on, the operation performance as a rechargeable battery deteriorated significantly. Through an investigation made on various factors, the present inventors have found that an oxide film produced on the surface of the metal collector foil affects the operation performance of the capacitor. This is because the oxide film is an insulator, and so the performance of the rechargeable battery deteriorates as the amount of oxide film increases.

A plain collector foil (i.e., a collector foil before being subjected to an etching process) has a flat and smooth surface and hence is likely to allow the occurrence of electrode separation when it is used for adhesive bonding with an electrode material. To deal with this problem, it has been an ordinary practice to etch the plain collector foil to form a dense network of microscopic channels or pits in surface area thereby to increase an increased bonding strength relative to the electrode material.

For convenience of manufacture, many etched collector foils are stored for a period of from several hours to several days rather than advanced to a subsequent processing operation. After etching, the foil surface is activated and hence actively reacts with oxygen in surrounding air. Thus, an oxide film produce on the surface area of the etched collector foil unavoidably grows up during the storage of the etched collector foil. An attempt to remove the oxide film just before the etched foil is subjected to a subsequent process (i.e., a bonding process in which an electrode material is attached by adhesion bonding to the surface the etched collector foil) may induce an additional cost, which increases the manufacturing cost of the capacitor.

Another finding through the afore-mentioned investigation is that chlorine remaining on the surface of the etched collector foil has a great influence on the age-related deterioration of the capacitor. The residual chlorine is caused by chlorine ions contained in an etching solution. Accordingly, the etched collector foil necessarily involves residual chlorine.

The residual chlorine is generally removed by washing. To improve the quality, the washing operation is repeated several times. Such repeated washing operation is, however, objectionable from the viewpoint of manufacturing cost.

Japanese Patent Laid-open Publication (JP-A1) No. 2001-176757 discloses the use of 99.99% pure aluminum foil as a collector foil in an electric double layer capacitor. The disclosed aluminum collector foil has a copper content blow 150 ppm. As is well known, in the manufacture of aluminum, bauxite ore is used as a starting material to produce alumina, which is then placed in an electrolytic furnace for purification to produce an aluminum ingot having an ordinary degree of purity in the range of from 90.0 to 99.85%. When needed, the aluminum ingot with ordinary purity is subjected to a secondary purification process in which the three-phase electrolyzing method or the segregation method is used to increase the purity of the aluminum ingot to 99.99% or higher. Such high purity aluminum is expensive, as it requires purification to be done repeatedly. The 99.99% pure aluminum foil disclosed in JP-A1-2001-176757 is also a high purity aluminum foil and hence expensive to manufacture. The use of the high purity aluminum foil in the manufacture of an electric double layer capacitor necessarily increases the manufacturing cost of the capacitor.

SUMMARY OF THE INVENTION

It is accordingly an object of the present invention to provide a metal collector foil and its production method that can effectively suppress the age-related deterioration of an electric double layer capacitor in which the collector foil is used, to thereby ensure high operation performance of the capacitor over a long period of use.

Another object of the present invention is to provide a metal collector foil and its production method that are highly cost-effective and can lower the manufacturing cost of an electric double layer capacitor in which the collector foil is used.

A further object of the present invention is to provide an electric double layer capacitor using the metal collector foil.

According to a first aspect of the present invention, there is provided a metal collector foil for an electric double layer capacitor, which comprises an etched metal collector foil having an oxide film in an amount of not greater than 300 mg/m$^2$, and a capacitance per unit surface area not less than 150 $\mu$F/cm$^2$.

Since the amount of oxide film produced on the etched collector foil does not exceed 300 mg/m$^2$, it is possible to suppress an objectionable increase in the internal resistance. An additional suppressing effect against the rise of internal resistance is achieved by the etched collector foil having a capacitance not less than 150 $\mu$F/cm$^2$. By a combination of the amount of oxide film and the capacitance that are controlled within given ranges, the capacitor can perform its prescribed functions reliably and stably over a long period of use without causing age-related deteriorations.

According to a second aspect of the present invention, there is provided a method of producing a metal collector foil for use in an electric double layer capacitor, comprising the steps of: preparing a plain metal foil; etching the metal foil in a chloride solution to dissolve a surface of the metal foil; and controlling the growth of an oxide film on the surface of the etched metal foil and the capacitance per unit surface area of the etched metal foil concurrently and separately such that the amount of the oxide film is not greater than 300 mg/m², and the capacitance per unit surface area is not less than 150 μF/cm².

According to a third aspect of the present invention, there is provided an electric double layer capacitor comprising a positive electrode and a negative electrode each having a metal collector foil and an electrode material formed mainly from activated carbon and bonded to both opposite surfaces of the metal foil, a dielectric separator disposed between the positive and negative electrodes, and a liquid electrolyte impregnated in the electrode material to enable charging and discharging of the electric double layer capacitor. The metal collector foil is an etched metal foil having an oxide film on the opposite surfaces thereof. The amount of the oxide film, immediately before the bonding of the etched metal foil relative to the electrode material, is greater than 300 mg/m², and a capacitance per unit surface area of the etched metal foil, immediately before the bonding of the etched metal foil relative to the electrode material, is not less than 150 μF/cm².

The etched metal collector foil is preferably free from a dielectric layer formed by an anodic formation process on a surface of the etched metal collector foil.

According to a fourth aspect of the present invention, there is provided a metal collector foil for an electric double layer capacitor, comprising an etched metal collector foil having been subjected to an etching process in an etching solution having a chlorine iron such that a capacitance per unit area of the etched metal collector foil obtained when the etched metal collector foil is subjected to an anodic formation process with application of a withstanding voltage of 65.5 volts is in a range of 1.7 to 2.3 μF/cm². The etched metal collector foil has a tensile strength not less than 9,000 N/cm² and a residual chlorine concentration not greater than 1.0 mg/m².

By virtue of the capacitance per unit area in a range of 1.7 to 2.3 μF/cm² and the residual chlorine concentration not greater than 1.0 mg/m², the etched metal foil when used in an electric double layer capacitor is able to suppress age-related deteriorations of the capacitor, thus enabling the capacitor to operate with high performance qualities over a long period of use. Furthermore, the etched metal foil having a tensile strength not less than 9,000 N/cm² is able to withstand a tensile force tending to damage or break the metal foil during its manufacture or during winding into a cylindrical electrode element. This may lead to a reduction of the manufacturing cost.

According to a fifth aspect of the present invention, there is provided a method of producing a metal collector foil for use in an electric double layer capacitor, comprising the steps of: preparing a plain metal foil; etching the metal foil in an etching solution having a chlorine iron such that a capacitance per unit area of the etched metal collector foil obtained when the etched metal collector foil is subjected to an anodic formation process with application of a withstanding voltage of 65.5 volts is in a range of 1.7 to 2.3 μF/cm², and the etched metal collector foil has a tensile strength not less than 9,000 N/cm²; and washing the etched metal foil to the extent that a residual chlorine concentration of the etched metal foil is not greater than 1.0 mg/m².

It is preferable that the metal foil is a plain aluminum foil, the etching is carried out at a temperature of 40 to 50° C. in a 5% hydrochloric acid solution with an AC current applied at 50 Hz with an electrolytic current density of 0.25 A/cm² and the quantity of electricity 35 to 40 A·min/dm², and the washing is carried out at a temperature of 50° C. in a pH 1 acid solution for 60 seconds.

According to a sixth aspect of the present invention, there is provided an electric double layer capacitor comprising a positive electrode and a negative electrode each having a metal collector foil and an electrode material formed mainly from activated carbon and bonded to both opposite surfaces of the metal foil, a dielectric separator disposed between the positive and negative electrodes, and a liquid electrolyte impregnated in the electrode material to enable charging and discharging of the electric double layer capacitor. The metal collector foil is an etched metal collector foil having been subjected to an etching process in an etching solution having a chlorine iron such that a capacitance per unit area of the etched metal collector foil obtained when the etched metal collector foil is subjected to an anodic formation process with application of a withstanding voltage of 65.5 volts is in a range of 1.7 to 2.3 μF/cm². The etched metal collector foil has a tensile strength not less than 9,000 N/cm² and a residual chlorine concentration not greater than 1.0 mg/m².

According to a seventh aspect of the present invention, there is provided a metal collector foil for use in an electric double layer capacitor, comprising an etched aluminum foil formed from a plain aluminum foil of an ordinary degree of purity not greater than 99.8%, the etched aluminum foil containing at least one of Cu, Ni, Zn, Sn and Fe with a content of Cu, Ni, Zn or Sn not greater than 10 ppm and a content of Fe not greater than 300 ppm. The purity of the aluminum foil prior to etching may be about 99.63–99.66%.

The use of an ordinarily-purified aluminum foil achieves a considerable reduction in the material cost of the electric double layer capacitor and contributes to the saving of a variable energy resource, which may otherwise be consumed during a three-phase electrolytic purification process when a highly-purified aluminum foil is needed.

According to an eighth aspect of the present invention, there is provided a method of producing a metal collector foil for use in an electric double layer capacitor, comprising the steps of: preparing a plain aluminum foil having an ordinary degree of purity not greater than 99.8% and containing at least one of Cu, Ni, Zn, Sn and Fe; and etching the plain aluminum foil in a hot solution of 5% hydrochloric acid to thereby obtain an etched aluminum foil of an aluminum content of not greater than 99.8% and containing at least one of Cu, Ni, Zn, Sn and Fe with a content of Cu, Ni, Zn or Sn not greater than 10 ppm and a content of Fe not greater than 300 ppm.

Preferably, the plain aluminum foil contains about 99.63–99.66% aluminum and at least one of Cu, Ni, Zn, Sn and Fe with a Cu content not greater than 23 ppm, an Ni content not greater than 17, a Zn content not greater than 18 ppm, an Sn content of not greater than 19 ppm and an Fe content not greater than 348 ppm.

According to a ninth aspect of the present invention, there is provided an electric double layer capacitor comprising a positive electrode and a negative electrode each having a metal collector foil and an electrode material formed mainly from activated carbon and bonded to both opposite surfaces of the metal foil, a dielectric separator disposed between the positive and negative electrodes, and a liquid electrolyte impregnated in the electrode material to enable charging and discharging of the electric double layer capacitor. The metal collector foil is an etched aluminum foil formed from a plain aluminum foil of an ordinary degree of purity not greater than 99.8%, and the etched aluminum foil contains at least one of Cu, Ni, Zn, Sn and Fe with a content of Cu, Ni, Zn or Sn not greater than 10 ppm and a content of Fe not greater than 300 ppm.

BRIEF DESCRIPTION OF THE DRAWINGS

Certain preferred structural embodiments of the present invention will be described in detail herein below, by way of example only, with the reference to the accompanying drawings, in which.

DETAILED DESCRIPTION OF THE PREFERRED EMBODIMENTS

Figure 1:
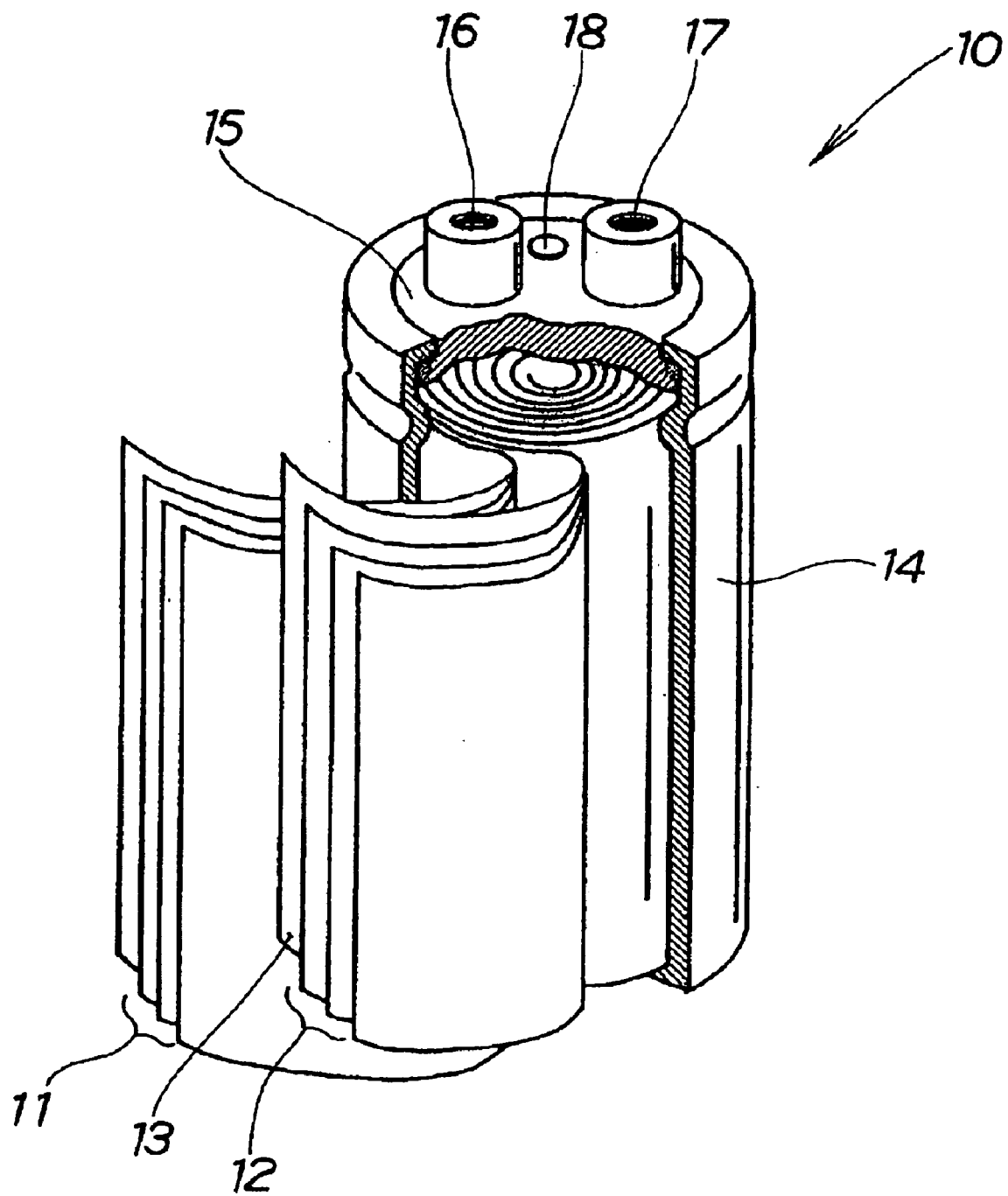
FIG. 1 is a perspective view, with parts cut away and with parts extended for clarity, of an electric double layer capacitor according to an embodiment of the present invention.

Referring now to the drawings and FIG. 1 in particular, there is shown an electric double layer capacitor 10 in which a metal collector foil according to a first embodiment of the present invention is used. The electric double layer capacitor 10 includes an elongated strip of positive electrode or anode 11 and an elongated strip of negative electrode or cathode 12 that are laminated together with a separator 13 disposed therein. The laminated anode and cathode 11 and 12 are tightly wound into a roll and received in a cylindrical container 14. Numeral 15 denotes an end seal plate for sealing an open end of the container 14, 16 a positive tab or terminal connected to the anode 11, 17 a negative tab or terminal connected to the cathode 12, and 18 an inlet for filling an electrolyte into the container 14.

Figure 2:
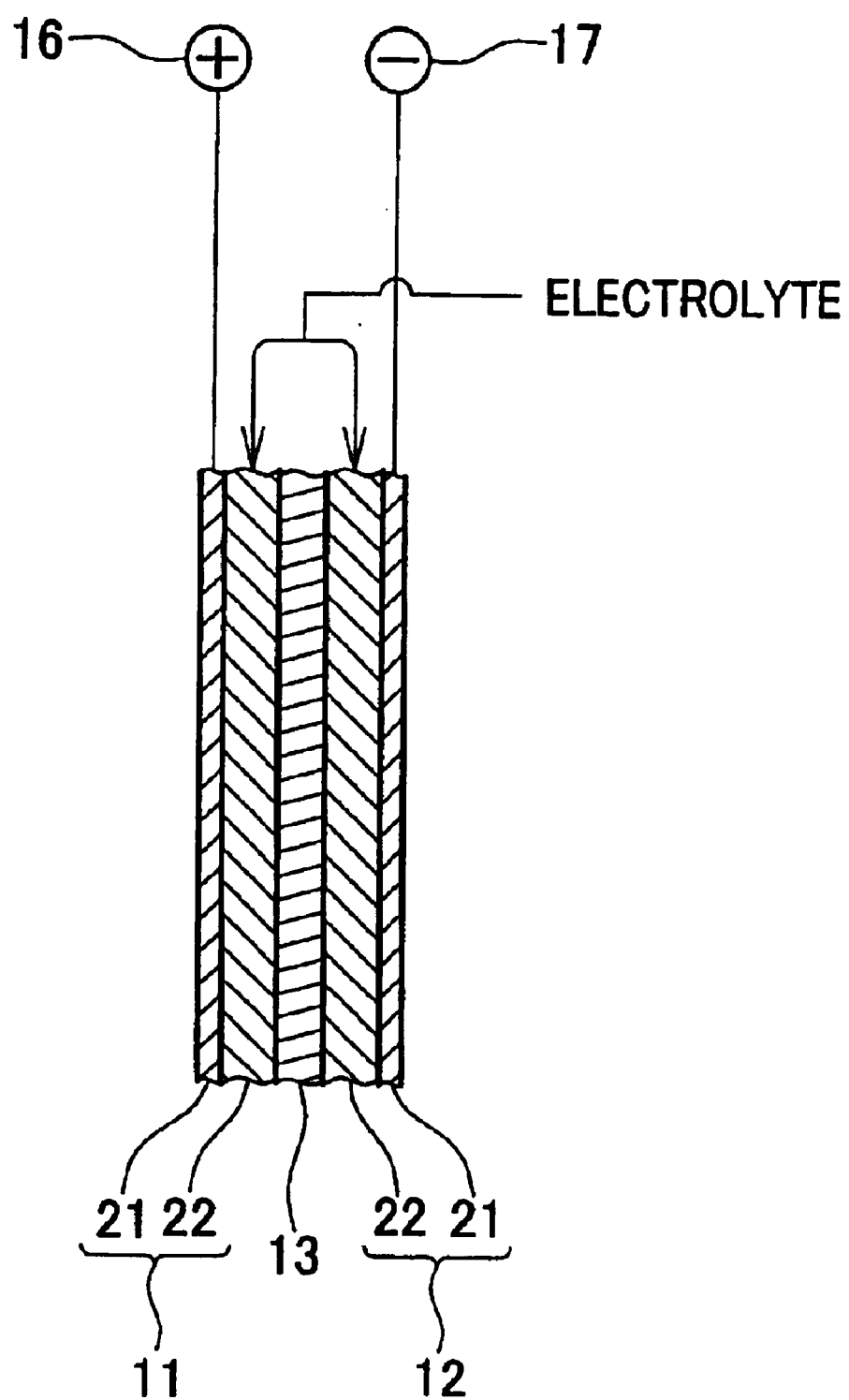
FIG. 2 is an enlarged cross-sectional view of a main portion of the electric double layer capacitor.

As diagrammatically shown on enlarged scale in FIG. 2, the anode 11 and the cathode 12 are each formed by a collector foil 21 made of metal such as aluminum, and an electrode material 22 formed mainly from activated carbon and bonded in the form of a sheet on both opposite surfaces of the metal collector foil 21. In FIG. 2, only one electrode material layer 22 for each of the anode 11 and the cathode 12 is shown for the purpose of illustration.

The electrode materials 22, 22 have an adequate amount of liquid electrolyte impregnated therein. When a DC voltage is applied across the positive and negative terminals 16 and 17, positive and negative ions electrostatically absorb to the interior of the electrode materials 22, 22 and to the surfaces of the metal collector foils 21, 21 so that they create a positive pole and a negative pole, respectively. Upon discharging, the absorbed ions shift to create motion or transfer of an electron so that an electric current can be taken out through the positive and negative terminals 16, 17.

Figure 3:
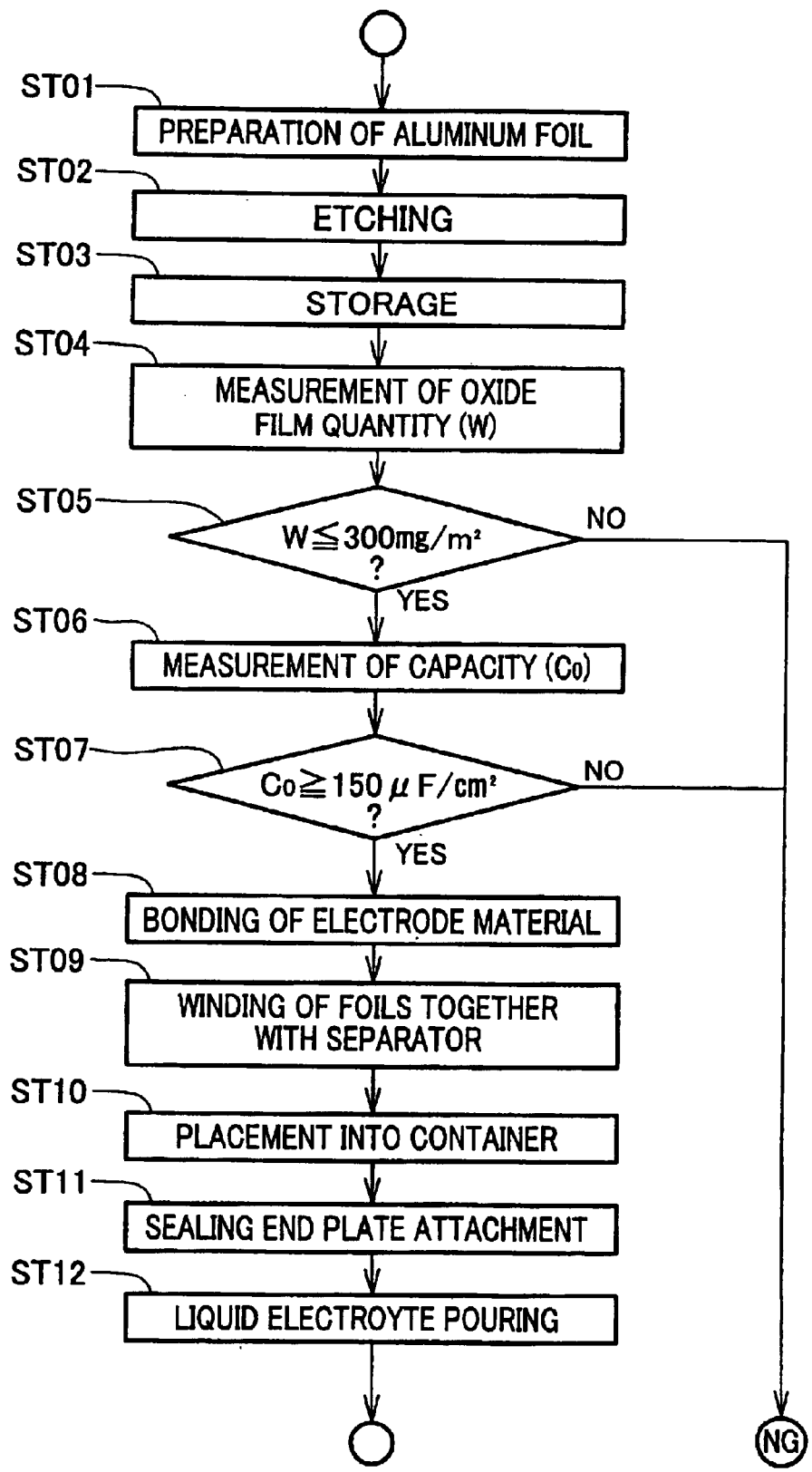
FIG. 3 is a flowchart showing a sequence of processing steps that are achieved to carry out a method according to a first embodiment of the present invention to produce the electric double layer capacitor shown in FIG. 1.

FIG. 3 is a flowchart showing a sequence of processing steps achieved to produce the electric double layer capacitor 10 according to the first embodiment of the present invention. As shown in this figure, a step ST01 prepares a metal collector foil, which is formed from, for example, a plain aluminum foil having a purity of at least 99.8%. The plain aluminum foil has a flat and smooth surface because it has not been surface-treated by an etching process or an anodic formation process.

At a step ST02, the aluminum foil is then etched in an etching solution containing hydrochloric acid to preferentially dissolve the surface of the aluminum foil. With this etching process, a roughed surface layer having fine pits is formed on the aluminum foil. The fine pits in the roughened surface serve to anchor an electrode material when the electrode material is later bonded to the aluminum foil. The etched aluminum foil is washed or otherwise cleaned for neutralization to the extent that the residual chlorine concentration of the cleaned collector foil meets a control criterion (not greater than 1.0 mg/m$^2$). Excessive cleaning of the etched foil can thus be avoided.

Then, a step ST03 undertakes storage of the etched collector foil. The etched collector foil is stored in an exposed state at room temperature in the atmosphere for several days. This storage step ST03 is done for the purpose of producing a test sample. In the ordinary manufacturing process, the etched collector foil is placed in a bag of resin film and the bag is then tightly sealed with a deoxidant received in the sealed bag. As an alternative, the etched collector foil is placed in the bag and after that the bag may be vented or deaerated, then tightly sealed with a nitrogen gas filled therein. By thus limiting or isolating the etched collector foil from contact with oxygen, it is possible to slow the growth of the oxide film.

A step ST04 performs measurement of the amount of oxide film. More concretely, upon the lapse of the storage period, the weight w1 of the sample foil (with an oxide film formed thereon) is measured. The sample foil is then immersed in a chromic-phosphoric solution to remove the oxide film, and after that by washing and drying the sample foil, we can obtain a sample foil, which is free from oxide film. The oxide-film-free sample foil is weighed on a scale to determine a weight w2 thereof. New, we can obtain the amount of oxide layer W in accordance with the following equation: W=(w1−w2)/area of the sample foil.

Then, a step ST05 determines whether or not the amount of oxide film W is smaller than or equal to 300 mg/m$^2$. The basis for using the criterion will be described later on. When the result of determination is affirmative (i.e., $W \leq 300$ mg/m$^2$), a step ST06 is then performed to measure the capacitance C0 of the etched collector foil. Alternatively when the determination result is negative (i.e., $W>300$ mg/m$^2$), the etched aluminum foil is judged as a defective foil.

Figure 4:
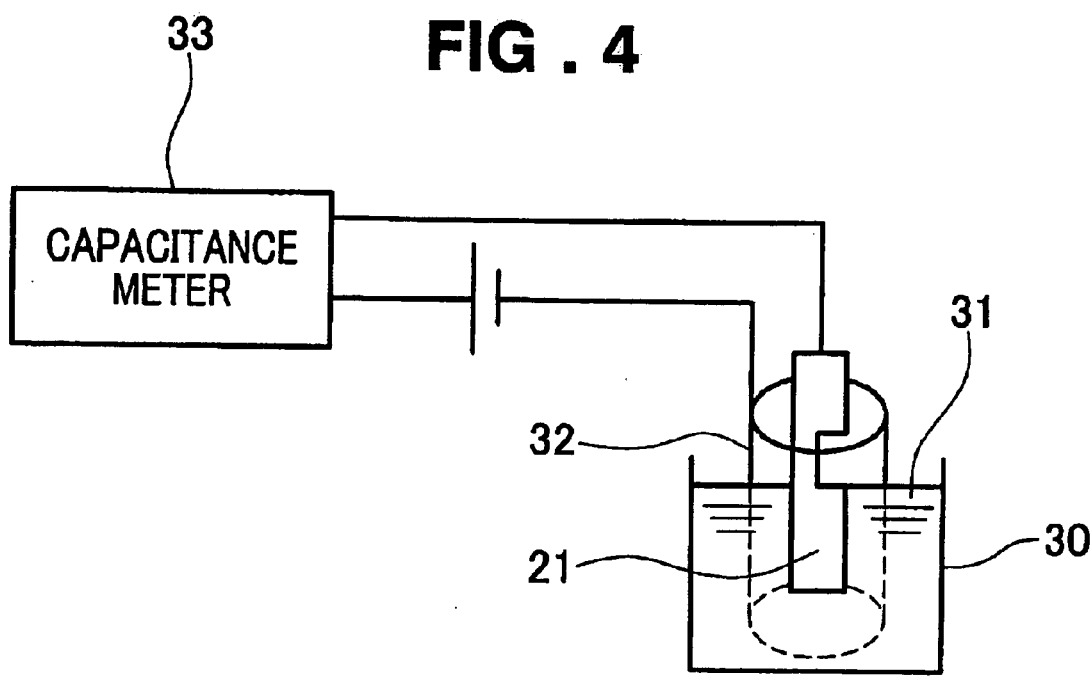
FIG. 4 is a diagrammatical view showing the principle of capacitance measurement of an etched metal collector foil that is used in the production of the electric double layer capacitor.

FIG. 4 diagrammatically shows a principle of the capacitance measurement used in ST04, where the etched foil 21 and an opposite electrode 32 disposed to surround the foil 21 are immersed in an aqueous solution 31 including ammonium adipic acid in a test container 30 and applied with a DC voltage with a capacitance meter 33 connected across the foil 21 and the electrode 32. By using the arrangement shown in FIG. 4, a capacitance value C0 of the etched foil 21 itself can be measured by the capacitance meter 33.

Then, a step ST07 shown in FIG. 3 determines whether or not the measured capacitance C0 of the etched foil 21 is greater than or equal to 150 $\mu$F/cm$^2$. The basis for using this criterion will be described later. When the result of determination is affirmative (i.e., $C0 \geq 150$ $\mu$F/cm$^2$), a step ST08 is then performed wherein an electrode material provided in the form of a sheet is adhesively bonded to the surface of the etched foil. Alternatively when the determination result is negative (i.e., $C0<150$ $\mu$F/cm$^2$), the etched aluminum foil is judged as a defective foil.

The step ST08 is followed by a step ST09 where two foils with electrode materials carried thereon are wound into a cylindrical element together with a separator. The cylindrical element is then placed in a cylindrical container at a step ST10 and after that an open end of the cylindrical container is hermetically closed by a sealing end plate at a step ST11. Subsequently, at a step ST12, a liquid electrolyte is filled in the container to impregnate the electrode materials. An electric double layer capacitor, such as one shown in FIG. 1, is thus obtained. The order or sequence of ST04–ST07 may be altered.

For a more complete understanding, the first embodiment of the present invention will now be described in greater detail with reference to the following examples.

EXAMPLES

For comparative purposes, eight samples were prepared under the conditions given below.
1. Materials
1-1. Metal Collector Foil
1-1-1. Pretreatment (Common to All Samples)

A plain aluminum foil was etched at 50° C. in a 5% hydrochloric acid solution with a 50 Hz AC current applied with an electrolytic current density of 0.25 A/cm$^2$ and a quantity of electricity of 35 A·min/dm$^2$.

The etched aluminum foil was washed at 50° C. in a pH1 aqueous acid solution for one minute and the washed foil was dried with hot air heated at 180° C.
1-1-2. Posttreatment and Measurement In Example 1, upon completion of the drying process, an amount of oxide film W on the etched foil and a capacitance C0 of the etched foil were determined through measurements taken in the manner as described above.

In Example 2, after drying, the etched foil was stored at 25° C. in the atmosphere for 200 hours, and after the lapse of the storage time, the same measurements were taken to determine an amount of oxide film W on the etched foil and a capacitance C0 of the etched foil.

In Example 3, after drying, the etched foil was stored at 25° C. in the atmosphere for 500 hours, and after the lapse of the storage time, the same measurements were taken to determine an amount of oxide film W on the etched foil and a capacitance C0 of the etched foil.

In Example 4, after drying, the etched foil was stored at 25° C. in the atmosphere for 700 hours, and after the lapse of the storage time, the same measurements were taken to determine an amount of oxide film W on the etched foil and a capacitance C0 of the etched foil.

In Comparative Example 1, after drying, the etched foil was stored at 25° C. in the atmosphere for 1,000 hours, and after the lapse of the storage time, the same measurements were taken to determine an amount of oxide film W on the etched foil and a capacitance C0 of the etched foil.

In Comparative Example 2, after drying, the etched foil was stored at 25° C. in the atmosphere for 1,500 hours, and after the lapse of the storage time, the same measurements were taken to determine an amount of oxide film W on the etched foil and a capacitance C0 of the etched foil.

In Comparative Example 3, after drying, the etched foil was stored at 25° C. in the atmosphere for 2,000 hours, and after the lapse of the storage time, the same measurements were taken to determine an amount of oxide film W on the etched foil and a capacitance C0 of the etched foil.

In Comparative Example 4, after drying, the etched foil was stored at 25° C. in the atmosphere for 3,500 hours, and after the lapse of the storage time, the same measurements were taken to determine an amount of oxide film W on the etched foil and a capacitance C0 of the etched foil.

After the measurements, the etched foil was immediately subjected to a subsequent process. The following conditions were common to all of Examples 1–4 and Comparative Examples 1–4.
1-2. Electrode Material 90 parts by weight of activated carbon, 5 parts by weight of graphite powder and 5 parts by weight of polytetrafluoroethylene (PTFE) were mixed together, kneaded and formed by rolling into a sheet-like electrode material having a thickness of 145 $\mu$m, a width of 100 mm and a length of 1,200 mm.
1-3. Adhesive A conductive adhesive composed of polyvinyl alcohol (PVA), graphite and amorphous carbon.
1-4. Separator A porous film of artificial silk having a thickness of 75 $\mu$m and a width of 105 mm.
1-5. Container A cylindrical container having a diameter of 40 mm and a height of 130 mm.
1-6. Electrolyte A liquid organic electrolyte consisting of toriethyl-monomethylammonium polytetrafluoroborate/propylene carbonate (TEMA.BF4/PC).
2. Preparation of Samples For each of the seven samples, the sheet-like electrode material was bonding with the adhesion to both opposite surfaces of the etched aluminum foil. Two such aluminum foils were wound into a cylindrical element together with the separator. The cylindrical element was placed in the container and an open end of the container was tightly sealed. Subsequently, the liquid electrolyte was filled in the container. An electric double layer capacitor was thus produced.
3. Additional Measurements
3-1. Cell Resistivity Measurement Using new or unused samples, a resistance value ($\Omega$) was measured by means of an ohm meter connected across the positive and negative terminals 16, 17 (see FIG. 1) of each sample capacitor. The measured resistance value A ($\Omega$) was multiplied by an area B (cm²) of the anode and cathode collector foils thereby to obtain a cell resistivity (Ωcm²). Thus, the resistivity (Ωcm²)=the resistance value A (Ω)×the area B (cm²) of anode and cathode collector foils. It is noted, however, that the cell resistivity thus obtained is a value when the electrode materials of 145 μm thick (see 3-1 above) are used.

3-2. Measurement of Resistivity Increase Rate after 2000 Hours Aging

After the measurement of cell resistivity, each sample capacitor was subjected to an aging process during which a DC voltage of 2.5V was continuously applied in a high temperature (45° C.) atmosphere for 2,000 hours. After the elapse of 2,000 hours, application of the DC voltage was terminated. Then, constant voltage discharge was started at room temperature with a current value kept at 30 A. The discharge continued until the voltage showed a drop from 2.5 V to 1.0 V. After the end of the discharge, a cell resistivity after 2,000 hours aging was obtained for each sample capacitor, in the same manner as described above in the preceding paragraph 3-1. The thus obtained cell resistivity after 2,000 hours aging was compared with the cell resistivity previously obtained so as to determine to what extent the cell resistivity increases after the 2,000 hours aging. The thus determined increase in the cell resistivity is indicated by percent and referred to as "cell resistivity increase rate after 2,000 hours aging".

Table 1 given below shows the storage time, amount of oxide film W, capacitance C0, cell resistivity and cell resistivity increase rate after 2,000 hours aging that are taken with respect to each of the eight sample capacitors. The data shown in Table 1 were used to prepare various graphs shown in FIGS. 5 and 6 for evaluation.

TABLE 1

|  | Storage Time (hr) | Amount of Oxide Film (mg/m²) | Capacitance (μF/cm²) | Cell Resistivity (Ω cm²) | Resistivity Increase Rate after 2,000 hr Aging (%) |
| --- | --- | --- | --- | --- | --- |
| Example 1 | 0 | 215 | 178 | 3.38 | 13.6 |
| Example 2 | 200 | 240 | 171 | 3.38 | 11.8 |
| Example 3 | 500 | 255 | 165 | 3.39 | 12.5 |
| Example 4 | 700 | 297 | 149 | 3.40 | 13.4 |
| Comparative Example 1 | 1,000 | 313 | 138 | 3.48 | 19.5 |
| Comparative Example 2 | 1,500 | 399 | 129 | 3.68 | 21.3 |
| Comparative Example 3 | 2,000 | 495 | 120 | 3.86 | 25.1 |
| Comparative Example 4 | 3,500 | 637 | 119 | 3.95 | 28.3 |

Figure 5:
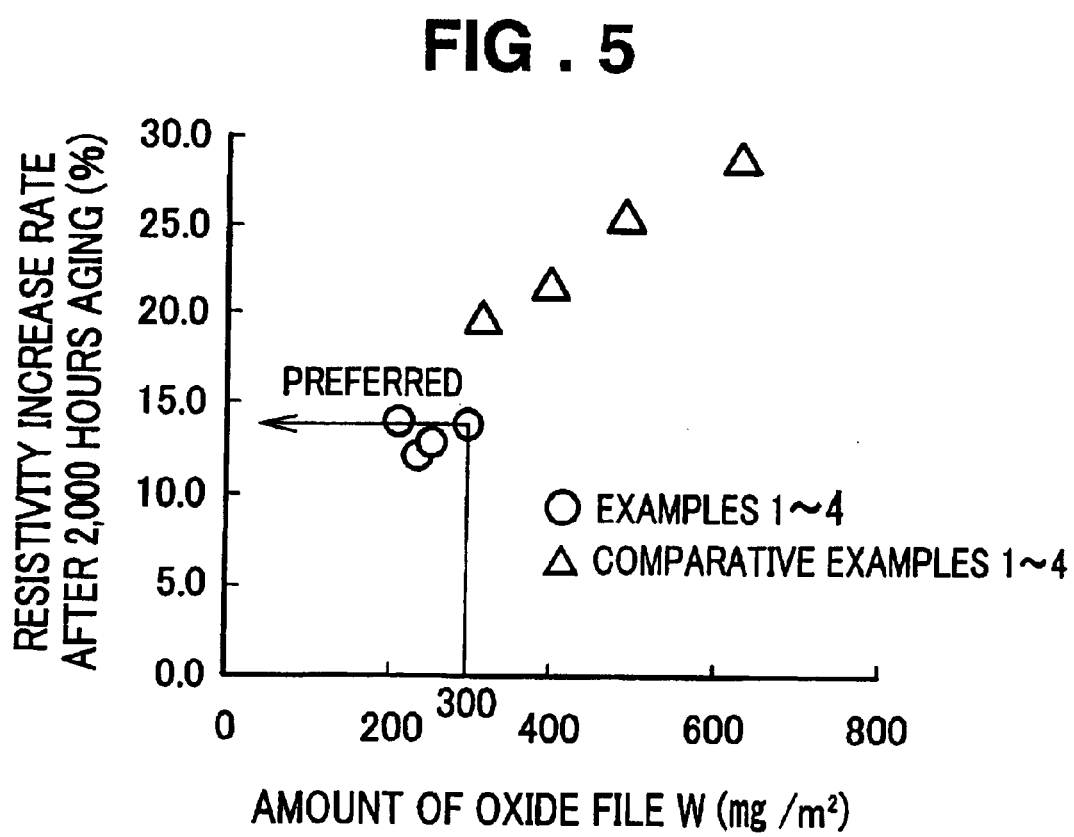
FIG. 5 is a graph showing the relationship between the amount of oxide film W and the resistivity increase rate after 2,000 hours aging.

FIG. 5 is a graph showing the relationship between the amount of oxide film W and the resistivity increase rate after 2,000 hours aging. The graph indicates values obtained in Examples 1 to 4 as circles and values obtained in Comparative Examples 1 to 4 as triangles. The resistivity increase rate after 2,000 hours aging indicates a degree of degradation under aging phenomena and takes larger values as the degradation progresses. Accordingly, the smaller the values of resistivity increase rate after 2,000 hours aging the better the quality of the capacitor. The values obtained in Examples 1–4 are smaller than those in Comparative Examples 1–4. It is evident from FIG. 5 that the age-related resistivity increase can be effectively suppressed when the amount of oxide film takes values below 300 mg/m². In case of Example 4, the etched metal foil is allowed to stand for storage over 700 hours (about one month). This will increase the flexibility of manufacturing plan. Additionally since the oxide film does not have to be removed, a marked increase in the manufacturing cost can be avoided.

Figure 6:
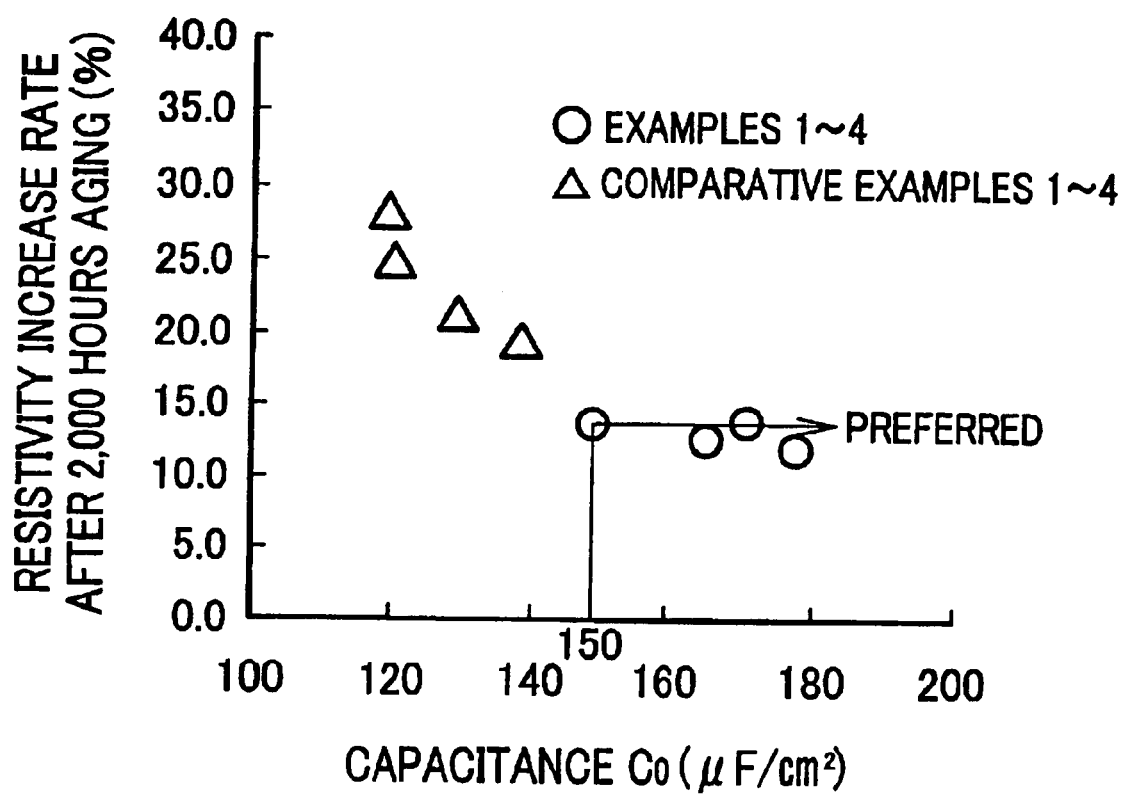
FIG. 6 is a graph showing the relationship between the capacitance C0 and the resistivity increase rate after 2,000 hours aging.

FIG. 6 is a graph showing the relationship between the capacitance C0 and the resistivity increase rate after 2,000 hours aging. The graph indicates values obtained in Examples 1–4 as circles and values obtained in Comparative Examples 1–4 as triangles. For the same reason as described above, the resistivity increase rate after 2,000 hours aging is preferably as small as possible. It appears clear from FIG. 6 that the resistivity increase rate after 2,000 hours aging is smaller in Examples 1–4 than in Comparative Examples 1–4. Furthermore, the resistivity increase rate after 2,000 hours aging shows a noticeable increase when the capacitance value C0 falls below 150 μF/cm². It can be appreciated that the capacitance C0 should preferably be not less than 150 μF/cm² for the purpose of suppressing age-related deterioration in performance of the capacitor.

As thus far explained, the metal collector foil of the present invention is used in an electric double layer capacitor. This particular application requires the collector foil to have an etched surface area, which is capable of providing a high bonding strength with a minimum increase in the resistance value when it is bonded by a conductive adhesive to a sheet-like electrode material.

The surface roughness of the etched surface area of the collector foil can be confirmed through a capacitance measurement effected on only a part of the etched collector foil after a dielectric layer (oxide layer) is formed on the surface of the etched foil part through an anodic formation process. The measured capacitance is proportional to the surface area of the etched surface, which varies with the density of microscopic channels or pits formed by etching.

The etched surface is highly reactive and hence allows oxidization to progress with time during the etching process or during a subsequent storage process. An oxide film is thus formed on the surface of the etched foil. In the course of manufacture of a capacitor, the oxide film is located at the interface between the collector foil and the sheet-like electrode material that are to be bonded together to form an electrode element. Due to the presence of the oxide film, the resistance value of the electrode element increases unavoidably, which will eventually increase the internal resistance of a capacitor as a final product, lower the process yield and cause considerable increases in the manufacturing cost. It is therefore essential for the etched foil to determine whether or not the etched foil is suited for the manufacture of a desired capacitor immediately before the foil is bonded to the electrode material.

In general, the oxide film can be measured directly through a chemical dissolving process using an acid. However, because the amount of oxide film is calculated in the form of an absolute quantity or a weight per nominal unit surface area, in order to determine an actual thickness of the oxide film which is directly linked to the electric resistance, the specific surface (the surface area per unit weight or volume) of the etched foil must be measured at the same time as the measurement of the oxide film so as to enable necessary conversion of the calculated value.

The surface area of the etched foil decreases with the growth of the oxide film. This phenomenon may be used to determine an increase in the capacitance. However, the oxide film formed at that time is too thin to determine the difference in thickness by using such a measuring method which is achieved to measure the capacitance after forced formation of a dielectric layer (oxide film) on the surface of the etched foil through an anodic formation process. By contrast, according to the present invention, capacitance measurement is effected on an etched but not yet formed foil (i.e., a foil that has been etched but has not been treated with an anodic formation process).

In view of the foregoing, according to the present invention, the amount of oxide film per nominal unit surface area and the capacitance of the etched but not yet formed foil are put into measurements right before the use of the foil (for bonding with the electrode material) so as to determine the degree of growth of a dielectric layer (oxide layer) inherently belonging to the surface of the etched foil itself. Stated in other words, according to the present invention, the absolute quantity of oxide film and the capacitance of the etched but not yet formed foil are controlled concurrently and separately for the purpose of producing a high performance electric double layer capacitor. Concurrent control of the amount of oxide and the capacitance is also able to preclude negative effects resulting from an etching failure.

Figure 7:
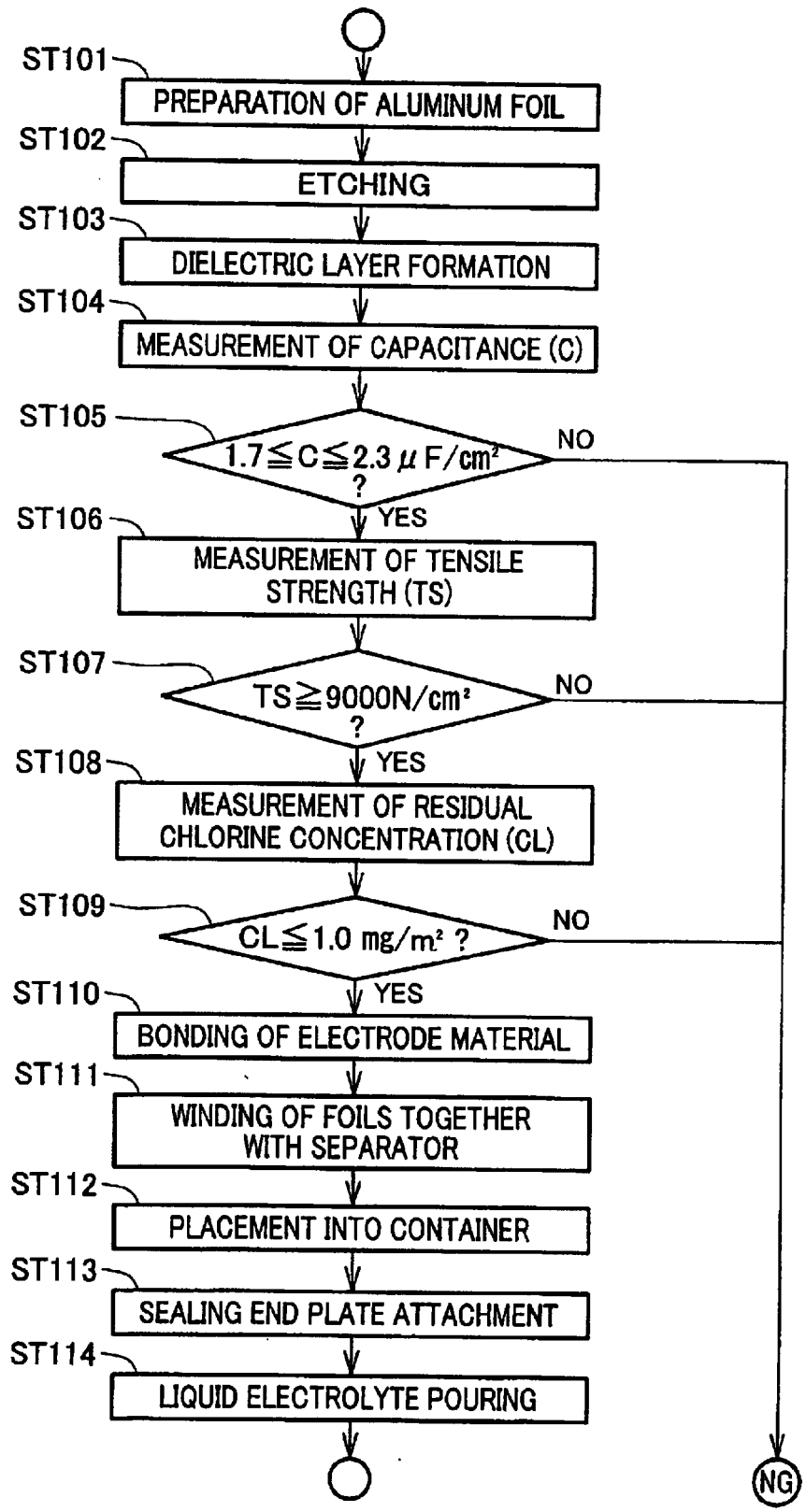
FIG. 7 is a flowchart showing a sequence of processing steps that are achieved to carry out a method according to a second embodiment of the present invention to produce an electric double layer capacitor of the same structure as shown in FIG. 1.

FIG. 7 is a flowchart showing a sequence of processing steps that are achieved to carry out a method according to a second embodiment of the present invention to produce an electric double layer capacitor of a structure same as one shown in FIG. 1. The method of the second embodiment differs from the method of the first embodiment described above in that the concentration of chlorine remaining on the surface of a foil after etching is controlled within a certain range.

As shown in FIG. 7, a step ST101 performs preparation of a plain aluminum foil. The aluminum foil has a purity of 99.8% or higher. The surface of the plain aluminum foil is flat and smooth.

At a step ST102, the aluminum foil is then etched in an etching solution containing hydrochloric acid to preferentially dissolve the surface of the aluminum foil. With this etching process, a roughed surface layer having a dense network of microscopic channels or pits is formed on the aluminum foil. The microscopic channels or pits in the roughened surface serve to anchor an electrode material when the electrode material is bonded to the aluminum foil, as explained later. The etched aluminum foil is subjected to a neutralizing process followed by a washing process. The washing process performs washing of the etched foil to the extent that the residual chlorine concentration is within a given control range (not greater than 1.0 mg/m$^2$). This means that complete removing of the residual chlorine by washing is not essential but the presence of the residual chlorine in a control amount is still allowed after washing.

Then, a step ST103 performs an anodic formation process as a pretreatment process achieved in advance to the capacitance measurement. In the anodic formation process, a foil strip cut off from the etched aluminum foil is immersed in an aqueous solution (forming bath) including ammonium adipic acid and applied with a DC voltage (dielectric withstanding voltage) of 65.5 volts so that the etched foil strip becomes positive and the solution becomes negative. Then an aluminum oxide film formed on the surface of the etched foil strip in proportion to the applied voltage. The anodic formation process is also called "anodic process" or "formation process" as a kind of chemical conversion treatment.

A step ST104 undertakes measurement of the capacitance of the etched aluminum foil. FIG. 4 diagrammatically shows a principle of the capacitance measurement used in ST04, where an etched and formed foil strip 21 and an opposite electrode 32 disposed to surround the foil strip 21 are immersed in an aqueous solution 31 including ammonium adipic acid in a test container 30 and applied with a DC voltage with a capacitance meter 33 connected across the foil strip 21 and the electrode 32. By using the arrangement shown in FIG. 4, a capacitance value C of the etched and formed foil strip 21 can be measured by the capacitance meter 33. By thus measuring the etched and formed foil strip 21, it is possible to determine a capacitance of the etched foil itself.

Then, a step ST105 shown in FIG. 7 determines whether or not the measured capacitance C of the foil strip 21 is in a range of 1.7 to 2.3 $\mu$F/cm$^2$. The basis for using the criterion will be discussed later on. When the result of determination is affirmative (i.e., $1.7 \leq C \leq 2.3$ $\mu$F/cm$^2$), a subsequent step ST106 is performed. Alternatively when the determination result is negative (i.e., C<1.7 or C>2.3 $\mu$F/cm$^2$), the etched aluminum foil is judged as a defective foil.

At the step ST106, a tensile strength TS of the etched foil is determined by measurement. For this measurement, a generally rectangular test piece of given size (10 mm in width and 50 mm in length plus opposite end margins for gripping) is cut out from the etched foil. The test piece is set on a tensile strength tester and a tensile strength of the text piece is measured according to the provisions stipulated by the Japanese Industrial Standards (JIS) B 7721. The measured tensile strength represents the tensile strength TS of the overall etched foil.

Then, a step ST107 makes a judgment to determine as to whether or not the measured tensile strength TS is above 9,000 N/cm$^2$. When the result of judgment is affirmative (i.e., TS$\geq$9,000 N/cm$^2$), a subsequent step ST108 is performed. Alternatively when the judgment result is negative (i.e., TS<1.7 9,000 N/cm$^2$), the etched aluminum foil is judged as a defective foil because it may be damaged or otherwise broken due to a tension applied thereto during a winding process, for example.

At the step ST108, a residual chlorine concentration CL of the etched foil is measured. More specifically, by using a sodium hydrate solution, a chlorine ion is extracted from the etched foil. The extracted solution is added with sulfuric acid and heated. Then, after clarification by a centrifugal separator, the extracted solution is added with a silver nitrate solution to become clouded as silver chloride. The degree of white turbidity of the extracted solution is compared with standard solutions to thereby determine a concentration of chlorine.

Subsequently, a step 109 makes a judgment to determine whether or not the residual chlorine concentration CL is not greater than 1.0 mg/m$^2$. The basis for using the criterion will be described later. When the result of judgment is affirmative (i.e., CL$\leq$1.0 mg/m$^2$), a subsequent step ST110 is performed. Alternatively when the judgment result is negative (i.e., CL>1.0 mg/m$^2$), the etched aluminum foil is judged as a defective foil.

At the step ST110, an electrode material provided in the form of a sheet is adhesively bonded to the surface of the etched foil. Subsequently, a step ST111 performs a winding process in which two foils with electrode materials carried thereon are wound into a cylindrical element together with a separator disposed between the foils. The cylindrical element is placed in a cylindrical container at a step ST112 and an open end of the cylindrical container is hermetically closed by a sealing end plate at a step ST113. Subsequently, at a step ST114, a liquid electrolyte is filled in the container to impregnate the electrode materials. An electric double layer capacitor, such as one shown in FIG. 1, is thus obtained.

Among the foregoing steps ST101–114, these steps ST103 to ST109 may be performed on a sampling basis and carried out off-line. The order or sequence of ST103–ST109 may be altered.

For a more complete understanding, the second embodiment of the present invention will now be described in greater detail with reference to the following examples.

EXAMPLES

For comparative purposes, eleven samples were prepared under the conditions given below.

1. Materials
1-1. Metal Collector Foil

A plain aluminum foil was etched at a temperature of 40 to 50° C. in a 5% hydrochloric acid solution with an AC current applied at 50 Hz with an electrolytic current density of 0.25 A/cm$^2$ and the quantity of electricity 25 to 45 A·min/dm$^2$. The temperature of the etching solution and the quantity of electricity were changed depending on Examples, as enumerated in Table 2 below.

The etched aluminum foil was removed from the etching bath and then washed at a temperature of 30–50° C. in a pH1 acid solution for 30 seconds or 60 seconds and subsequently dried with hot air heated at 180° C. The temperature of the washing solution and the washing time were set to change depending on Examples, as enumerated in Table 2.

TABLE 2

| Example | Temperature of Etching Solution (° C.) | Quantity of Electricity (A · min/dm$^2$) | Temperature of Washing Solution (° C.) | Washing Time (Sec) |
|---|---|---|---|---|
| Example 1 | 45 | 35 | 50 | 60 |
| Example 2 | 47 | 35 | 50 | 60 |
| Example 3 | 50 | 35 | 50 | 60 |
| Example 4 | 50 | 38 | 50 | 60 |
| Example 5 | 50 | 40 | 50 | 60 |
| Comparative Example 1 | 40 | 25 | 50 | 60 |
| Comparative Example 2 | 40 | 28 | 50 | 60 |
| Comparative Example 3 | 42.5 | 40 | 50 | 60 |
| Comparative Example 4 | 45 | 45 | 50 | 60 |
| Comparative Example 5 | 50 | 30 | 40 | 30 |
| Comparative Example 6 | 50 | 30 | 30 | 30 |

1-2. Electrode Material 90 parts by weight of activated carbon, 5 parts by weight of graphite powder and 5 parts by weight of polytetrafluoroethylene (PTFE) were mixed together, kneaded and formed by rolling into a sheet-like electrode material having a thickness of 145 µm, a width of 100 mm and a length of 1,200 mm.

1-3. Adhesive

A conductive adhesive composed of polyvinyl alcohol (PVA), graphite and amorphous carbon.

1-4. Separator

A porous film of artificial silk having a thickness of 75 µm and a width of 105 mm.

1-5. Container

A cylindrical container having a diameter of 40 mm and a height of 130 mm.

1-6. Electrolyte

A liquid organic electrolyte consisting of toriethylmonomethylammonium polytetrafluoroborate/propylene carbonate (TEMA.BF4/PC).

2. Preparation of Samples

For each of the eleven samples, the sheet-like electrode material was bonding with the adhesion to both opposite surfaces of the etched aluminum foil. Two such aluminum foils were wound into a cylindrical element together with the separator. The cylindrical element was sealed inside the container and the liquid electrolyte was filled in the container. An electric double layer capacitor was thus produced.

3. Measurement 3-1. Capacitance Measurement

According to the method as described above with reference to FIG. 4.

3-2. Tensile Strength Measurement

According to the method as described above.

3-3. Residual Chlorine Concentration Measurement

According to the method as described above.

3-4. Cell Resistivity Measurement

Using new or unused samples, a resistance value (Ω) was measured by means of an ohm meter connected across the positive and negative terminals 16, 17 (see FIG. 1) of each sample capacitor. The measured resistance value A (Ω) was multiplied by an area B (cm$^2$) of the anode and cathode collector foils thereby to obtain a cell resistivity (Ωcm$^2$). Thus, the resistivity (Ωcm$^2$)=the resistance value A (Ω)×the area B (cm$^2$) of anode and cathode collector foils. It is noted, however, that the cell resistivity thus obtained is a value when the electrode material of 145 µm thick (see 1–2 above) is used.

3-5. Measurement of Resistivity Increase Rate after 2000 Hours Aging

After the measurement of cell resistivity, each sample capacitor was subjected to an aging process during which a DC voltage of 2.5V was continuously applied in a high temperature (45° C.) atmosphere for 2,000 hours. After the elapse of 2,000 hours, application of the DC voltage was terminated. Then, constant voltage discharge was started at room temperature with a current value kept at 30 A. The discharge continued until the voltage showed a drop from 2.5 V to 1.0 V. After the end of the discharge, a cell resistivity after 2,000 hours aging was obtained for each sample capacitor, in the same manner as described above in the preceding paragraph 3-4. The thus obtained cell resistivity after 2,000 hours aging was compared with the cell resistivity previously obtained so as to determine to what extent the cell resistivity increases after the 2,000 hours aging. The thus determined increase in the cell resistivity is indicated by percent and referred to as "cell resistivity increase rate after 2,000 hours aging".

3-6. Electrode Separation

After the measurement of resistivity increase rate after 2,000 hours aging, each sample was disassembled and the foils and the electrode materials were visually checked for the occurrence of electrode separation. At that time, if the sheet-like electrode material still remained bonded on the mating foil, the sample was evaluated as "no separation observed". In the case where the electrode material partly separated from the foil, the sample was evaluated as "partial separation observed", and if a major part of the electrode material separated from the foil, the sample was evaluated as "separation observed".

Table 3 given below shows the capacitance, tensile strength, residual chloride concentration, cell resistivity, cell resistivity increase rate after 2,000 hours aging and electrode separation that are taken with respect to the respective samples (Examples 1–5 and Comparative Examples 1–6). The data shown in this table are used for making various graphs for evaluation, as will be discussed below.

TABLE 3

|  | Capacitance at 65.5 V ($\mu F/cm^2$) | Tensile Strength ($N/cm^2$) | Residual Chlorine Concentration ($mg/m^2$) | Cell Resistivity ($\Omega \; cm^2$) | Resistivity Increase Rate After 2,000 Hours Aging (%) | Electrode Separation After 2,000 Hours Aging |
|---|---|---|---|---|---|---|
| Example 1 | 1.70 | 11,010 | 0.89 | 3.28 | 14.6 | no separation observed |
| Example 2 | 1.89 | 10,680 | 0.85 | 3.26 | 13.8 | no separation observed |
| Example 3 | 2.03 | 10,360 | 0.86 | 3.30 | 12.9 | no separation observed |
| Example 4 | 2.16 | 9,850 | 0.91 | 3.31 | 13.4 | no separation observed |
| Example 5 | 2.30 | 9,210 | 0.93 | 3.51 | 14.9 | no separation observed |
| Comparative Example 1 | 1.32 | 11,350 | 0.89 | 3.62 | 37.0 | separation observed |
| Comparative Example 2 | 1.56 | 11,250 | 0.95 | 3.48 | 22.3 | partial separation observed |
| Comparative Example 3 | 2.43 | 8,400 | 0.86 | 3.76 | 18.9 | no separation observed |
| Comparative Example 4 | 2.53 | 7,150 | 0.98 | 4.21 | 17.6 | no separation observed |
| Comparative Example 5 | 2.04 | 10,720 | 1.30 | 3.48 | 105.0 | separation observed |
| Comparative Example 6 | 1.98 | 10,830 | 2.10 | 3.50 | 113.0 | separation observed |

Figure 8:
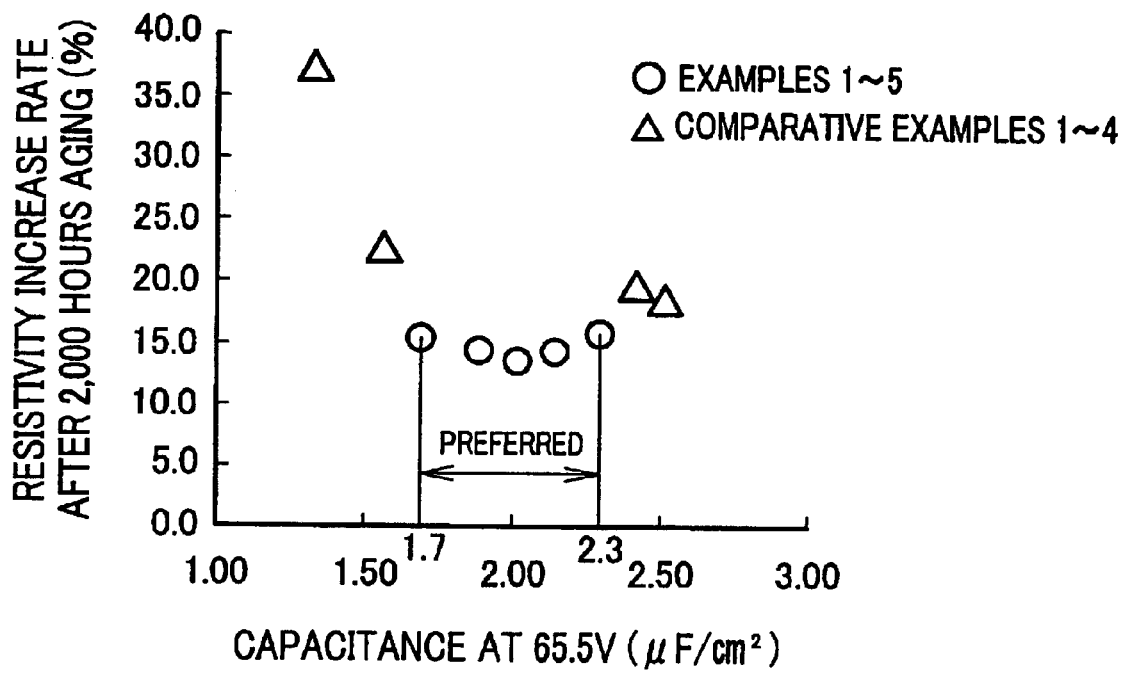
FIG. 8 is a graph showing the relationship between the capacitance at 65.5V and the resistivity increase rate after 2,000 hours.

FIG. 8 is a graph showing the relationship between the capacitance at 65.5V and the resistivity increase rate after 2,000 hours aging. The graph indicates values obtained in Examples 1 to 5 as circles and values obtained in Comparative Examples 1 to 4 as triangles. The resistivity increase rate after 2,000 hours aging indicates a degree of degradation under aging phenomena and takes larger values as the degradation progresses. Accordingly, the smaller the values of resistivity increase rate after 2,000 hours aging the better the quality of the capacitor. The resistivity increase rates in Examples 1–4 take values near 15.0% and they are smaller than those obtained in Comparative Examples 1–4. It can be appreciated from FIG. 8 that the capacitance at 65.5V is preferably in a range of 1.7 to 2.3 $\mu F/cm^2$.

Figure 9:
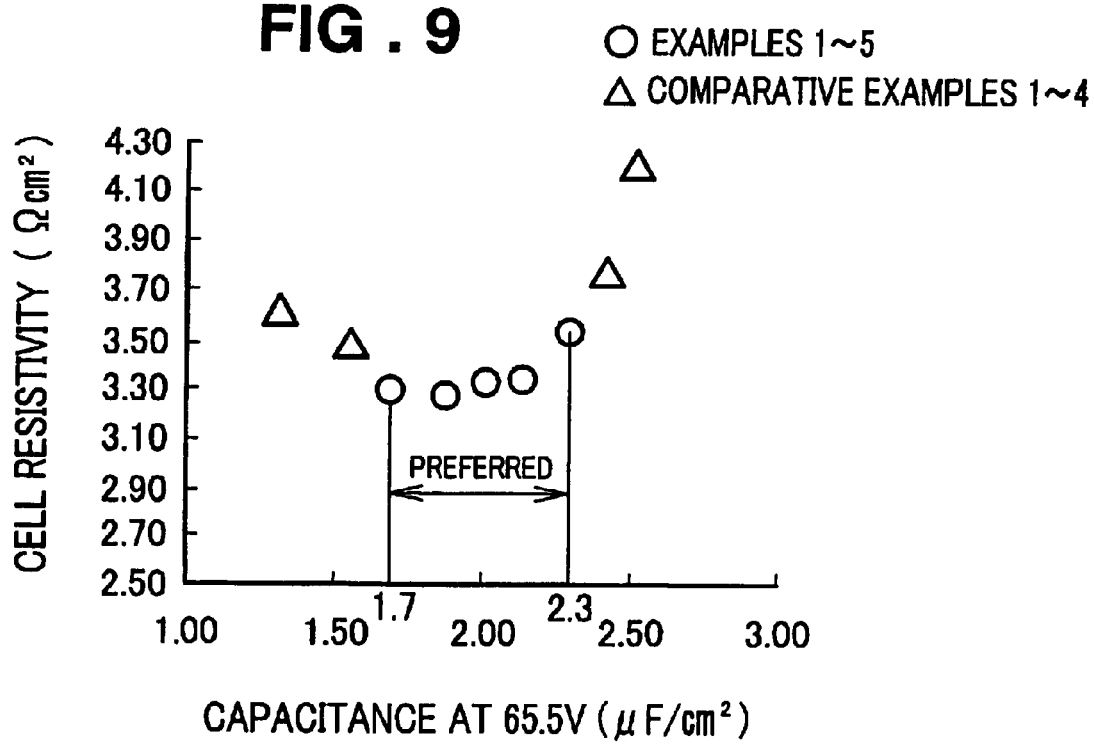
FIG. 9 is a graph showing the relationship between the capacitance at 65.5V and the cell resistivity.

FIG. 9 is a graph showing the relationship between the capacitance at 65.5V and the cell resistivity. The graph indicates values obtained in Examples 1 to 5 as circles and values obtained in Comparative Examples 1 to 4 as triangles. The cell resistivity is a specific resistance at the initial stage, but obviously this value should preferably as small as possible. Evaluation based on the preferable capacitance range (1.7 to 2.3 $\mu F/cm^2$) obtained in FIG. 8 indicates that the cell resistivity is smaller in Examples 1–5 than in Comparative Examples 1–4. It is evidenced from FIG. 9 that the resistance at 65.5V is preferably in the range of 1.7 to 2.3 $\mu F/cm^2$.

Figure 10:
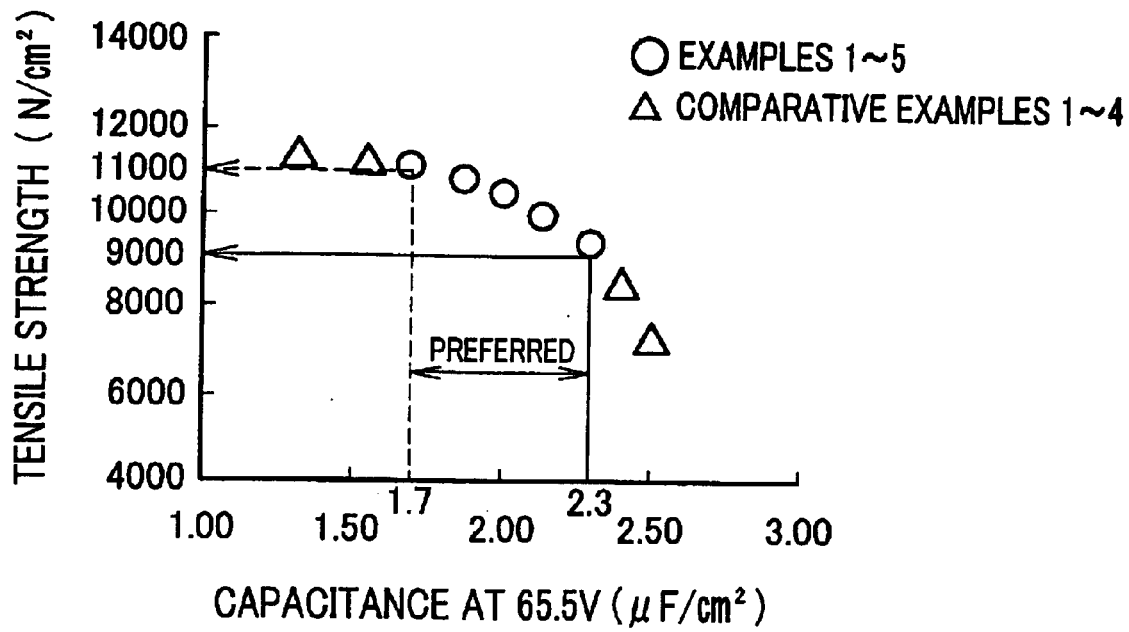
FIG. 10 is a graph showing the relationship between the capacitance at 65.5V and the tensile strength.

FIG. 10 is a graph showing the relationship between the capacitance at 65.5V and the tensile strength. The graph indicates values obtained in Examples 1 to 5 as circles and values obtained in Comparative Examples 1 to 4 as triangles. The capacitance increases with the surface area of the foil, which can be increased by roughening the foil surface by etching. On the other hand, surface roughening by etching decreases the cross-sectional area of the foil, which leads to a decrease in the tensile strength. This tendency is confirmed by the graph shown in FIG. 10. As shown in FIG. 10, when the capacitance is 2.3 $\mu F/cm^2$, we can obtain a tensile strength greater than 9,000 $N/cm^2$, and a capacitance of 1.7 $\mu F/cm^2$ provides a tensile strength of 11,000 $N/cm^2$. It is therefore confirmed that the capacitance of the etched foil is preferably in the range of 1.7 to 2.3 $\mu F/cm^2$.

Figure 11:
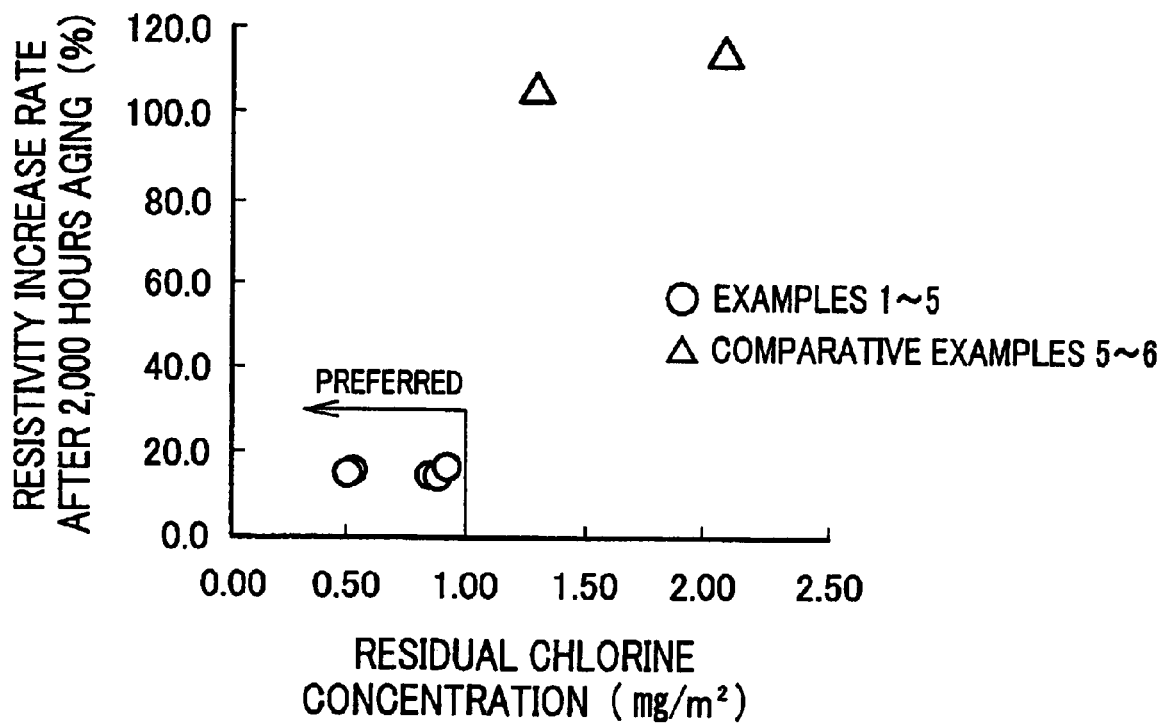
FIG. 11 is a graph showing the relationship between the residual chlorine concentration and the resistivity increase rate after 2,000 hours aging.

FIG. 11 is a graph showing the relationship between the residual chlorine concentration and the resistivity increase rate after 2,000 hours aging, which is prepared for evaluation of the residual chlorine concentration. The graph indicates values obtained in Examples 1 to 5 as circles and values obtained in Comparative Examples 5 and 6 as triangles. As is apparent from FIG. 11, in Comparative Examples 5 and 6, the resistivity increase rate after 2,000 hour aging takes excessively large values such as 100% or greater, whereas in Examples 1–5, the resistivity increase rate after 2,000 hour aging is very low, such as about 15% or smaller. Such a low resistivity increase rate is acceptable in view of the performance of the capacitor. It is evident from FIG. 11 that the residual chlorine concentration of the etched foil is preferably not greater than 1.0 $mg/m^2$ for the purpose of suppressing the age-related deteriorations.

It will be appreciated from Table 3 and FIGS. 8–11 that in order to suppress the age-related deteriorations, it is important to control the capacitance per unit surface area of the foil per se within a range of 1.7 to 2.3 $\mu F/cm^2$ and also control the residual chlorine concentration per unit surface area of the etched foil to be not greater than 1.0 $mg/m^2$. Furthermore, the tensile strength of the etched foil should preferably be 9,000 $N/cm^2$ or greater so as to prevent the etched foil from being damaged or broken due to a tension applied thereto during its manufacture or during winding into a cylindrical electrode element.

Figure 12:
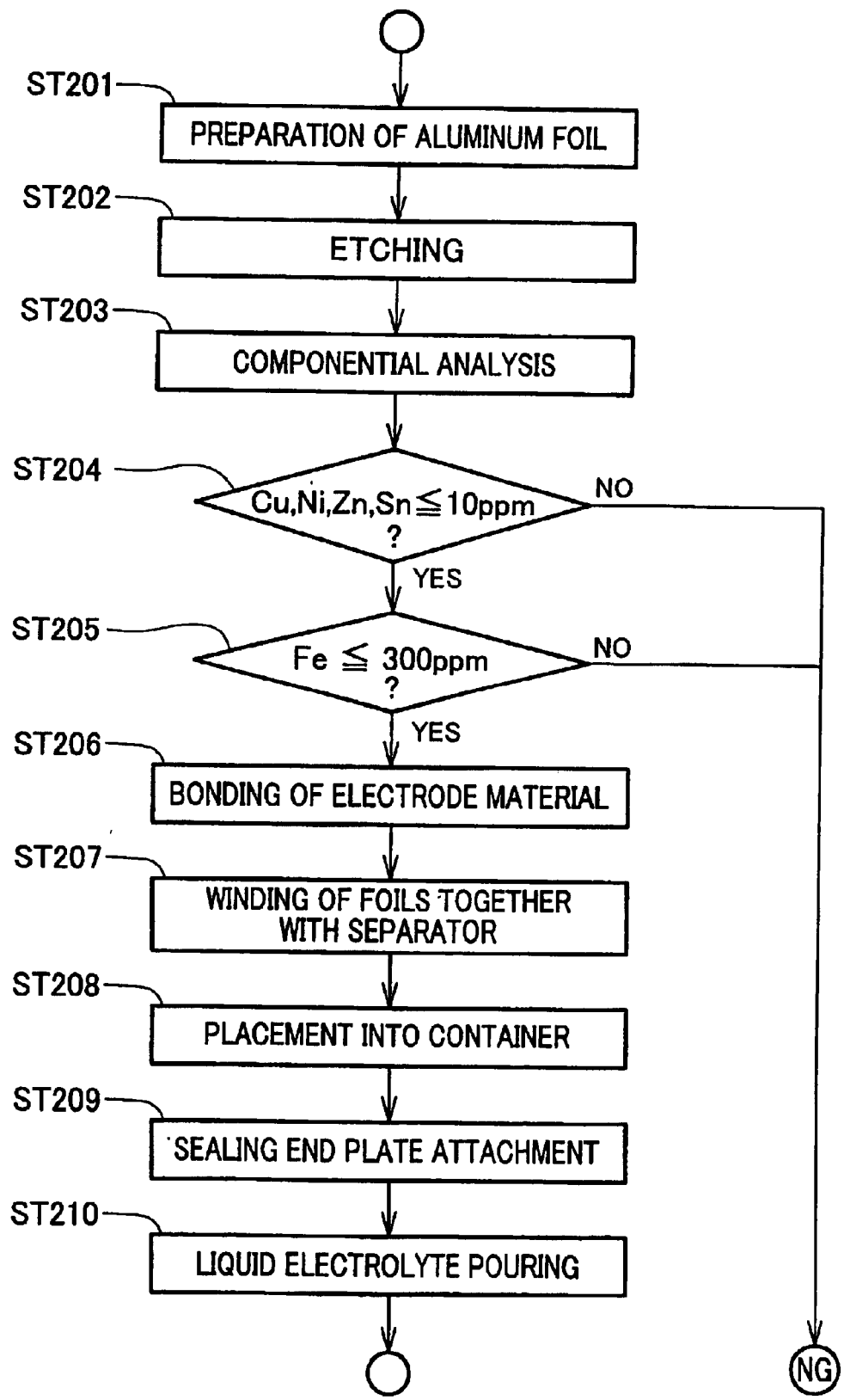
FIG. 12 is a flowchart showing a sequence of processing steps that are achieved to carry out a method according to a third embodiment of the present invention to produce an electric double layer capacitor of the same structure as shown in FIG. 1.

FIG. 12 is a flowchart showing a sequence of processing steps that are achieved to carry out a method according to a third embodiment of the present invention to produce an electric double layer capacitor of a structure same as one shown in FIG. 1. This embodiment is based on a finding obtained after repeating trial production and its evaluation many times that aluminum foils of an ordinary degree of purity (i.e., 90.0 to 99.85% purity) can be used as a plain foil for the manufacture of an electric double layer capacitor by controlling the content of Cu or other components than aluminum.

As shown in FIG. 12, a step ST201 performs preparation of a plain aluminum foil. The aluminum foil has an ordinary degree of purity (90.0 to 99.85%). The surface of the plain aluminum foil is flat and smooth.

At a step ST202, the aluminum foil is then etched in an etching solution containing hydrochloric acid to preferentially dissolve the surface of the aluminum foil. With this etching process, a roughed surface layer having a dense network of microscopic channels or pits is formed on the aluminum foil. The microscopic channels or pits in the roughened surface serve to anchor an electrode material when the electrode material is bonded to the aluminum foil, as explained later. The etched aluminum foil is subjected to a neutralizing process followed by a washing process. The washing process is carried out to perform washing of the etched foil to the extent that the residual chlorine concentration is within a given control range (not greater than 1.0 mg/m$^2$). This means that complete removing of the residual chlorine by washing is not essential but the presence of the residual chlorine in a control amount is still allowed after washing.

Then, a step ST203 performs component analysis of the etched foil. More specifically, a foil strip having a weight of 1 g is cut out from the etched foil and fully dissolved in a phosphoric acid. A dissolved solution is subjected to a quantitative componential analysis using an ICO (Inductively Coupled Plasma) optical emission spectrometer (available as SPS-4000 of Seiko Instruments, Inc.).

Subsequently, a step ST204 determines whether or not the contents of Cu, Ni, Zn and Sn are each not greater than 10 ppm. The basis for using such criterion will be discussed later. When the result of determination is affirmative (i.e., Cu, Ni, Zn, Sn≦10 ppm), a subsequent step ST205 is performed. Alternatively when the determination result is negative (i.e., Cu, Ni, Zn, Sn>10 ppm), the etched aluminum foil is evaluated as a defective foil.

At the step ST205, a judgment is made to determine whether or not the content of Fe is not greater than 300 ppm. The basis for using the criterion will be discussed later. When the result of judgment is affirmative (i.e., Fe≦300 ppm), a subsequent step ST206 is performed. Alternatively when the determination result is negative (i.e., Fe>300 ppm), the etched aluminum foil is evaluated as a defective foil.

At the step ST206, an electrode material provided in the form of a sheet is adhesively bonded to the surface of the etched aluminum foil. Two such foils each carrying thereon a sheet of electrode material are wound into a cylindrical element together with a separator at a step ST207. The cylindrical element is then placed in a cylindrical container at a step ST208 and after that an open end of the cylindrical container is hermetically closed by a sealing end plate at a step ST209. Subsequently, at a step ST210, a liquid electrolyte is filled in the container to impregnate the electrode materials. An electric double layer capacitor, such as one shown in FIG. 1, is thus obtained. The order or sequence of ST04–ST05 may be altered.

For a more complete understanding, the third embodiment of the present invention will now be described in greater detail with reference to the following examples.

EXAMPLES

For comparative purposes, twenty samples were prepared under the conditions given below.

1. Materials
1-1. Metal Collector Foil
1-1-1. Plain Aluminum Foil

Plain aluminum foils whose components are as shown in Table 4 were prepared were prepared as ordinarily-purified aluminum foils having purities below 99.8%.

TABLE 4

| | Components (ppm) | | | | | (%) |
|---|---|---|---|---|---|---|
| | Cu | Ni | Zn | Sn | Fe | Al |
| Example 1 | 15 | — | 3 | — | 335 | 99.647 |
| Example 2 | 23 | — | 2 | — | 326 | 99.649 |
| Example 3 | 13 | 11 | 2 | — | 342 | 99.632 |
| Example 4 | 13 | 17 | 2 | — | 348 | 99.620 |
| Example 5 | 9 | — | 13 | — | 331 | 99.647 |
| Example 6 | 11 | — | 18 | — | 341 | 99.630 |
| Example 7 | 11 | — | 2 | 14 | 312 | 99.661 |
| Example 8 | 12 | — | 2 | 19 | 341 | 99.626 |
| Example 9 | 13 | — | 3 | — | 331 | 99.653 |
| Example 10 | 13 | — | 3 | — | 341 | 99.643 |
| Comparative Example 1 | 32 | — | 2 | — | 343 | 99.623 |
| Comparative Example 2 | 43 | — | 2 | — | 312 | 99.643 |
| Comparative Example 3 | 13 | 22 | 3 | — | 346 | 99.616 |
| Comparative Example 4 | 9 | 41 | 3 | — | 343 | 99.604 |
| Comparative Example 5 | 9 | — | 21 | — | 333 | 99.637 |
| Comparative Example 6 | 8 | — | 37 | — | 344 | 99.611 |
| Comparative Example 7 | 10 | — | 2 | 43 | 345 | 99.600 |
| Comparative Example 8 | 9 | — | 2 | 56 | 349 | 99.584 |
| Comparative Example 9 | 11 | — | 2 | — | 476 | 99.511 |
| Comparative Example 10 | 12 | — | 2 | — | 593 | 99.393 |

As appears clear from Table 4 above, the plain aluminum foils each have a purity of approximately 99.4 to 99.7% and contains Cu, Ni, Zn or Sn in an amount of several to several tens ppm and Fe in an amount of about 300 to 600 ppm.

1-1-2. Treatment of Plain Aluminum Foil

In each of Examples 1–10 and Comparative Examples 1–10, the plain aluminum foil was etched at a temperature of 50° C. in a 5% hydrochloric acid solution with an AC current applied at 50 Hz with an electrolytic current density of 0.25 A/cm$^2$ and the quantity of electricity 35 A·min/dm$^2$. The etched aluminum foil was removed from the etching bath and then washed at a temperature of 50° C. in a pH1 acid solution for one minute and subsequently dried with hot air heated at 180° C.

1-1-2. Componential Analysis

Upon completion of the hot air drying, a quantitative componential analysis of the etched aluminum foil was taken in a manner described above with the results as shown in Table 5 below.

TABLE 5

| | Components (ppm) | | | | |
|---|---|---|---|---|---|
| | Cu | Ni | Zn | Sn | Fe |
| Example 1 | 8.5 | — | 0.9 | — | 275 |
| Example 2 | 10.0 | — | 1.1 | — | 268 |
| Example 3 | 7.8 | 4.5 | 0.8 | — | 288 |
| Example 4 | 8.3 | 9.8 | 0.9 | — | 294 |
| Example 5 | 6.5 | — | 7.4 | — | 263 |
| Example 6 | 7.3 | — | 10.0 | — | 259 |
| Example 7 | 8.1 | — | 0.8 | 5.5 | 245 |
| Example 8 | 8.6 | — | 0.9 | 9.7 | 268 |
| Example 9 | 9.3 | — | 1.0 | — | 274 |
| Example 10 | 7.1 | — | 1.0 | — | 289 |
| Comparative Example 1 | 15.3 | — | 0.9 | — | 289 |

TABLE 5-continued

| | Components (ppm) | | | | |
|---|---|---|---|---|---|
| | Cu | Ni | Zn | Sn | Fe |
| Comparative Example 2 | 22.4 | — | 0.7 | — | 246 |
| Comparative Example 3 | 7.6 | 18.3 | 1.0 | — | 284 |
| Comparative Example 4 | 6.9 | 25.9 | 1.0 | — | 278 |
| Comparative Example 5 | 5.2 | — | 12.8 | — | 256 |
| Comparative Example 6 | 4.8 | — | 19.8 | — | 268 |
| Comparative Example 7 | 6.3 | — | 0.9 | 16.6 | 264 |
| Comparative Example 8 | 5.3 | — | 0.9 | 27.3 | 279 |
| Comparative Example 9 | 6.6 | — | 0.6 | — | 356 |
| Comparative Example 10 | 7.2 | — | 0.3 | — | 481 |

As appears clear from Tables 4 and 5 that Cu, Ni, Zn, Sn and Fe contents of the aluminum foil decreased after the etching process. This may be considered that when alloy elements were etched off from the foil surface into the etching solution, Cu, Ni, Zn, Sn and Fe were dissolved in greater amounts than aluminum as the base material with the result that the Cu, Ni, Zn, Sn and Fe contents decreased with respect to the base material.

1-2. Electrode Material 90 parts by weight of activated carbon, 5 parts by weight of graphite powder and 5 parts by weight of polytetrafluoroethylene (PTFE) were mixed together, kneaded and formed by rolling into a sheet-like electrode material having a thickness of 145 μm, a width of 100 mm and a length of 1,200 mm.

1-3. Adhesive

A conductive adhesive composed of polyvinyl alcohol (PVA), graphite and amorphous carbon.

1-4. Separator

A porous film of artificial silk having a thickness of 75 μm and a width of 105 mm.

1-5. Container

A cylindrical container having a diameter of 40 mm and a height of 130 mm.

1-6. Electrolyte

A liquid organic electrolyte consisting of toriethylmonomethylammonium polytetrafluoroborate/propylene carbonate (TEMA.BF4/PC)

2. Preparation of Samples

For each of the twenty samples, the sheet-like electrode material was bonding with the adhesion to both opposite surfaces of the etched aluminum foil. Two such aluminum foils were wound into a cylindrical element together with the separator. The cylindrical element was sealed inside the container and the liquid electrolyte was filled in the container. An electric double layer capacitor was thus produced.

3. Measurement of Voltage Maintenance Ratio

A DC constant voltage of 2.5 volts was applied across the positive and negative terminals 16 and 17 (see FIG. 1) of each sample capacitor to charge the capacitor for 6 hours. After the lapse of 6 hours, a power supply cable was detached from the positive and negative terminals and immediately thereafter a voltage V1 at the positive and negative terminals of the capacitor was measured. Then, the capacitor was left standing at 25° C. in the atmosphere for 72 hours hereby to allow free discharging of the capacitor. After the lapse of 72 hours, the residual voltage V2 of the capacitor was measured. Then, from a formula: 100× (V1−V2)/V1, a voltage retention ratio was obtained with the results shown in Table 6 below.

TABLE 6

| | Components (ppm) | | | | | Voltage Retention Ratio (%) |
|---|---|---|---|---|---|---|
| | Cu | Ni | Zn | Sn | Fe | |
| Example 1 | 8.5 | — | 0.9 | — | 275 | 92.9 |
| Example 2 | 10.0 | — | 1.1 | — | 268 | 93.2 |
| Example 3 | 7.8 | 4.5 | 0.8 | — | 288 | 93.5 |
| Example 4 | 8.3 | 9.8 | 0.9 | — | 294 | 92.8 |
| Example 5 | 6.5 | — | 7.4 | — | 263 | 93.1 |
| Example 6 | 7.3 | — | 10.0 | — | 259 | 92.9 |
| Example 7 | 8.1 | — | 0.8 | 5.5 | 245 | 93.2 |
| Example 8 | 8.6 | — | 0.9 | 9.7 | 268 | 93.5 |
| Example 9 | 9.3 | — | 1.0 | — | 274 | 93.8 |
| Example 10 | 7.1 | — | 1.0 | — | 289 | 92.9 |
| Comparative Example 1 | 15.3 | — | 0.9 | — | 289 | 65.3 |
| Comparative Example 2 | 22.4 | — | 0.7 | — | 246 | 45.8 |
| Comparative Example 3 | 7.6 | 18.3 | 1.0 | — | 284 | 45.1 |
| Comparative Example 4 | 6.9 | 25.9 | 1.0 | — | 278 | 41.3 |
| Comparative Example 5 | 5.2 | — | 12.8 | — | 256 | 55.4 |
| Comparative Example 6 | 4.8 | — | 19.8 | — | 268 | 35.8 |
| Comparative Example 7 | 6.3 | — | 0.9 | 16.6 | 264 | 59.3 |
| Comparative Example 8 | 5.3 | — | 0.9 | 27.3 | 279 | 44.2 |
| Comparative Example 9 | 6.6 | — | 0.6 | — | 356 | 86.3 |
| Comparative Example 10 | 7.2 | — | 0.3 | — | 481 | 70.1 |

In Table 6, the voltage retention ratio is shown in combination with the Cu, Ni, Zn, Sn and Fe contents shown in Table 5, for facilitating comparison between Examples 1–10 and Comparative Examples 1–10. As appears clear from Table 6, the voltage retention ratios in Examples 1–10 are very high and all exceed 92%, while the voltage retention ratios in Comparative Examples 1–10 are relatively low and all below 90% with most Comparative Examples being less than 70%. This may be considered that in Comparative Examples 1–10, charged electric energy was burnt away due to a short circuit phenomenon occurred inside the capacitor.

A detailed study of Table 6 indicates that the Cu content exceeds 15 ppm in Comparative Examples 1 and 2 while it is below 10 ppm in Examples 1–10 and Comparative Examples 3–10. From this it can be appreciated that an excessively large Cu content of the etched aluminum foil is a factor leading to a reduction in the voltage retention ratio of a capacitor, as in Comparative Examples 1 and 2.

Similarly, the Ni content exceeds 18 ppm in Comparative Examples 3 and 4 while it is below 10 ppm in Examples 3 and 4. From this it will be appreciated that an excessively large Ni content of the aluminum foil is also a factor leading to a reduction in the voltage retention ratio of a capacitor, as in Comparative Examples 3 and 4.

The Zn content exceeds 12 ppm in Comparative Examples 5 and 6 while it is below 10 ppm in Examples 1–10 and the remaining Comparative Examples. From this it can be appreciated that an excessively large Zn content of the aluminum foil is a factor leading to a reduction in the voltage retention ratio of a capacitor, as in Comparative Examples 5 and 6.

Similarly, the Sn content exceeds 16 ppm in Comparative Examples 7 and 8 while it is below 10 ppm in Examples 7 and 8. From this it will be appreciated that an excessively large Sn content of the aluminum foil is also a factor leading to a reduction in the voltage retention ratio of a capacitor, as in Comparative Examples 7 and 8.

The Fe content exceeds 350 ppm in Comparative Examples 9 and 10 while it is below 300 ppm in Examples 1–10 and the remaining Comparative Examples. From this it can be appreciated that an excessively large Fe content of the aluminum foil is a factor leading to a reduction in the voltage retention ratio of a capacitor, as in Comparative Examples 9 and 10.

It will be appreciated from the foregoing discussion that an etched foil, immediately before it is bonded with an electrode material, has a Cu, Ni, Zn or Sn content of not greater than 10 ppm and an Fe content of not greater than 300 ppm will able to prevent the occurrence of a short circuit inside an electric double layer capacitor thereby to provide a high voltage retention ratio.

In certain preferred embodiment described above, the metal collector foils are formed from an aluminum foil. The material for the collector foil should by no means be limited to the aluminum but may include other metals than aluminum. Furthermore, the present invention can be effectively used in a cylindrical capacitor as in the illustrated embodiment as well as a flat plate-like capacitor so that the shape and configuration of the capacitor may be changed in option. The electric double layer capacitor of the present invention is particularly advantageous when used in a vehicle as an onboard battery.

Obviously, various minor changes and modifications are possible in the light of the above teaching. It is to be understood that within the scope of the appended claims the present invention may be practiced otherwise than as specifically described.

What is claimed is:

1. A metal collector foil for an electric double layer capacitor, comprising:
   an etched metal collector foil having an oxide film in an amount not greater than 300 mg/m$^2$, and a capacitance per unit surface area not less than 150 $\mu$F/cm$^2$.

2. The metal collector foil according to claim 1, wherein the etched metal collector foil is free from a dielectric layer formed by an anodic formation process on a surface of the etched metal collector foil.

3. A method of producing a metal collector foil for use in an electric double layer capacitor, comprising the steps of:
   preparing a plain metal foil;
   etching the metal foil in a chloride solution to dissolve a surface of the metal foil; and
   controlling the growth of an oxide film on the surface of the etched metal foil and the capacitance per unit surface area of the etched metal foil concurrently and separately such that the amount of the oxide film is not greater than 300 mg/m$^2$, and the capacitance per unit surface area is not less than 150 $\mu$F/cm$^2$.

4. The method according to claim 3, wherein the etched metal collector foil is free from a dielectric layer formed by an anodic formation process on the surface of the etched metal collector foil.

5. An electric double layer capacitor comprising:
   a positive electrode and a negative electrode each having a metal collector foil and an electrode material formed mainly from activated carbon and bonded to both opposite surfaces of the metal foil;
   a dielectric separator disposed between the positive and negative electrodes; and
   a liquid electrolyte impregnated in the electrode material to enable charging and discharging of the electric double layer capacitor,
   wherein the metal collector foil is an etched metal foil having an oxide film on the opposite surfaces thereof, the amount of the oxide film, immediately before the bonding of the etched metal foil relative to the electrode material, is greater than 300 mg/m$^2$, and a capacitance per unit surface area of the etched metal foil, immediately before the bonding of the etched metal foil relative to the electrode material, is not less than 150 $\mu$F/cm$^2$.

6. The electric double layer capacitor according to claim 5, wherein the etched metal collector foil is free from a dielectric layer formed by an anodic formation process on the surface of the etched metal collector foil.

7. A metal collector foil for an electric double layer capacitor, comprising:
   an etched metal collector foil having been subjected to an etching process in an etching solution having a chlorine iron such that a capacitance per unit area of the etched metal collector foil obtained when the etched metal collector foil is subjected to an anodic formation process with application of a withstanding voltage of 65.5 volts is in a range of 1.7 to 2.3 $\mu$F/cm$^2$, the etched metal collector foil having a tensile strength not less than 9,000 N/cm$^2$ and a residual chlorine concentration not greater than 1.0 mg/m$^2$.

8. A method of producing a metal collector foil for use in an electric double layer capacitor, comprising the steps of:
   preparing a plain metal foil;
   etching the metal foil in an etching solution having a chlorine iron such that a capacitance per unit area of the etched metal collector foil obtained when the etched metal collector foil is subjected to an anodic formation process with application of a withstanding voltage of 65.5 volts is in a range of 1.7 to 2.3 $\mu$F/cm$^2$, and the etched metal collector foil has a tensile strength not less than 9,000 N/cm$^2$; and
   washing the etched metal foil to the extent that a residual chlorine concentration of the etched metal foil is not greater than 1.0 mg/m$^2$.

9. The method according to claim 8, wherein the metal foil is a plain aluminum foil, the etching is carried out at a temperature of 40 to 50° C. in a 5% hydrochloric acid solution with an AC current applied at 50 Hz with an electrolytic current density of 0.25 A/cm$^2$ and the quantity of electricity 35 to 40 A·min/dm$^2$, and the washing is carried out at a temperature of 50° C. in a pH1 acid solution for 60 seconds.

10. An electric double layer capacitor comprising:
    a positive electrode and a negative electrode each having a metal collector foil and an electrode material formed mainly from activated carbon and bonded to both opposite surfaces of the metal foil;
    a dielectric separator disposed between the positive and negative electrodes; and
    a liquid electrolyte impregnated in the electrode material to enable charging and discharging of the electric double layer capacitor,
    wherein the metal collector foil is an etched metal collector foil having been subjected to an etching process in an etching solution having a chlorine iron such that a capacitance per unit area of the etched metal collector foil obtained when the etched metal collector foil is subjected to an anodic formation process with application of a withstanding voltage of 65.5 volts is in a range of 1.7 to 2.3 $\mu F/cm^2$, and the etched metal collector foil has a tensile strength not less than 9,000 $N/cm^2$ and a residual chlorine concentration not greater than 1.0 $mg/m^2$.

11. A metal collector foil for use in an electric double layer capacitor, comprising:

an etched aluminum foil formed from a plain aluminum foil of an ordinary degree of purity not greater than 99.8%, the etched aluminum foil containing at least one of Cu, Ni, Zn, Sn and Fe with a content of Cu, Ni, Zn or Sn not greater than 10 ppm and a content of Fe not greater than 300 ppm.

12. The metal collector foil according to claim 11, wherein the purity of the aluminum foil prior to etching is about 99.63–99.66%.

13. A method of producing a metal collector foil for use in an electric double layer capacitor, comprising the steps of:

preparing a plain aluminum foil having an ordinary degree of purity not greater than 99.8% and containing at least one of Cu, Ni, Zn, Sn and Fe; and etching the plain aluminum foil in a hot solution of 5% hydrochloric acid to thereby obtain an etched aluminum foil of an aluminum content of not greater than 99.8% and containing at least one of Cu, Ni, Zn, Sn and Fe with a content of Cu, Ni, Zn or Sn not greater than 10 ppm and a content of Fe not greater than 300 ppm.

14. The method according to claim 13, wherein the plain aluminum foil contains about 99.63–99.66% aluminum and at least one of Cu, Ni, Zn, Sn and Fe with a Cu content not greater than 23 ppm, an Ni content not greater than 17, a Zn content not greater than 18 ppm, an Sn content of not greater than 19 ppm and an Fe content not greater than 348 ppm.

15. An electric double layer capacitor comprising:

a positive electrode and a negative electrode each having a metal collector foil and an electrode material formed mainly from activated carbon and bonded to both opposite surfaces of the metal foil;

a dielectric separator disposed between the positive and negative electrodes; and a liquid electrolyte impregnated in the electrode material to enable charging and discharging of the electric double layer capacitor, wherein the metal collector foil is an etched aluminum foil formed from a plain aluminum foil of an ordinary degree of purity not greater than 99.8%, and the etched aluminum foil contains at least one of Cu, Ni, Zn, Sn and Fe with a content of Cu, Ni, Zn or Sn not greater than 10 ppm and a content of Fe not greater than 300 ppm.

16. The electric double layer capacitor according to claim 15, wherein the purity of the aluminum foil prior to etching is about 99.63–99.66%.

* * * * *